US009065766B2

(12) United States Patent
Matsuoka

(10) Patent No.: US 9,065,766 B2
(45) Date of Patent: Jun. 23, 2015

(54) MEDIUM FOR STORING PACKET CONVERSION PROGRAM, PACKET CONVERSION APPARATUS AND PACKET CONVERSION METHOD

(75) Inventor: Naoki Matsuoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 483 days.

(21) Appl. No.: 13/449,375

(22) Filed: Apr. 18, 2012

(65) Prior Publication Data

US 2012/0307826 A1 Dec. 6, 2012

(30) Foreign Application Priority Data

Jun. 2, 2011 (JP) ................................. 2011-124661

(51) Int. Cl.
*H04L 12/28* (2006.01)
*H04L 12/931* (2013.01)
*H04L 12/46* (2006.01)

(52) U.S. Cl.
CPC .............. *H04L 49/354* (2013.01); *H04L 49/70* (2013.01); *H04L 12/4625* (2013.01)

(58) Field of Classification Search
USPC ......................................................... 370/390
See application file for complete search history.

(56) References Cited

U.S. PATENT DOCUMENTS

| 2005/0152271 A1* | 7/2005 | Rindborg et al. ............. 370/230 |
| 2005/0160174 A1* | 7/2005 | Ingmar et al. ................. 709/228 |
| 2007/0153741 A1* | 7/2007 | Blanchette et al. ........... 370/331 |
| 2007/0245033 A1* | 10/2007 | Gavrilescu et al. ........... 709/230 |
| 2008/0247395 A1* | 10/2008 | Hazard ......................... 370/392 |
| 2009/0067429 A1* | 3/2009 | Nagai et al. ................... 370/392 |
| 2011/0202920 A1* | 8/2011 | Takase ............................ 718/1 |
| 2011/0222551 A1* | 9/2011 | Porat ............................. 370/401 |

FOREIGN PATENT DOCUMENTS

JP 2009-118127 5/2009

* cited by examiner

*Primary Examiner* — Gerald Smarth
(74) *Attorney, Agent, or Firm* — Fujitsu Patent Center

(57) ABSTRACT

Upon obtaining a packet including a broadcast/multicast MAC address from a virtual machine, a packet conversion apparatus obtains, based on first association information, a subnet identifier corresponding to the MAC address of the obtained packet, also obtains, based on second association information, a packet type identifier corresponding to the MAC address of the obtained packet, converts the packet to be transmitted to a different computer via a network into a multicast packet by setting the subnet identifier obtained based on the first association information and the packet type identifier obtained based on the second association information in a field of the MAC address of the packet to be transmitted, and transmits the packet to be transmitted, which is obtained by being converted, to the different computer via the network.

16 Claims, 21 Drawing Sheets

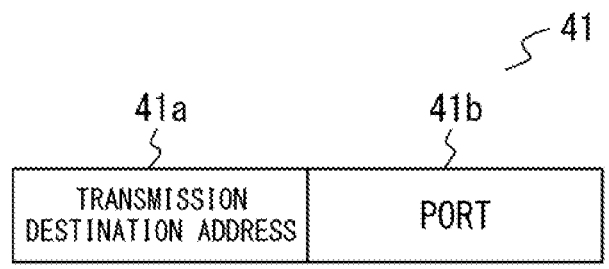
F I G. 3

| RECEPTION RULES |
|---|
| · MAC ADDRESS OF VIRTUAL MACHINE ACCOMMODATED BY VIRTUAL SWITCH |
| · SUBNET IDENTIFIER |

FIG. 4

| MAC Address | CODE VALUE | |
|---|---|---|
| FF-FF-FF-FF-FF-FF | 01-01-00 | BROADCAST |
| 01-00-5E---** | 01-02-00 | IP MULTICAST |
| 01-00-5E-8*-- | 01-02-01 | MPLS MULTICAST |
| 01-80-C2-00-00-00 | 01-02-02 | STP |
| 09-00-09-00-00-01 | 01-02-03 | HP Probe |
| : | : | |

VM TRANSMISSION PACKET (45)

| MACDA | MACSA | type | Payload |
|---|---|---|---|
| 46 | 47 | 48 | 49 |

FIG. 6B

MACDA (46) (FOR UNICAST)

| I/G IDENTIFIER | TRANSMISSION DESTINATION VM IDENTIFIER | | | | | NOTE |
|---|---|---|---|---|---|---|
| FIRST BYTE | SECOND BYTE | THIRD BYTE | FOURTH BYTE | FIFTH BYTE | SIXTH BYTE | |
| 00 | XX | XX | XX | XX | XX | UNICAST (NOT CONVERTED) (TRANSMISSION DESTINATION VM MAC ADDRESS) |

FIG. 6C

MACDA (46) (FOR BROADCAST, MULTICAST)

| I/G IDENTIFIER | PACKET IDENTIFIER | MC TYPE | SUBNET IDENTIFIER | | | NOTE |
|---|---|---|---|---|---|---|
| FIRST BYTE | SECOND BYTE | THIRD BYTE | FOURTH BYTE | FIFTH BYTE | SIXTH BYTE | |
| 01 | 01 | 00 | XX | XX | XX | BROADCAST |
| 01 | 02 | 00~FF | XX | XX | XX | MULTICAST PACKET |

FIG. 6D

MACSA (47)

| I/G IDENTIFIER | TRANSMISSION DESTINATION VM IDENTIFIER | | | | | NOTE |
|---|---|---|---|---|---|---|
| FIRST BYTE | SECOND BYTE | THIRD BYTE | FOURTH BYTE | FIFTH BYTE | SIXTH BYTE | |
| 00 | XX | XX | XX | XX | XX | TRANSMISSION SOURCE VM MAC ADDRESS |

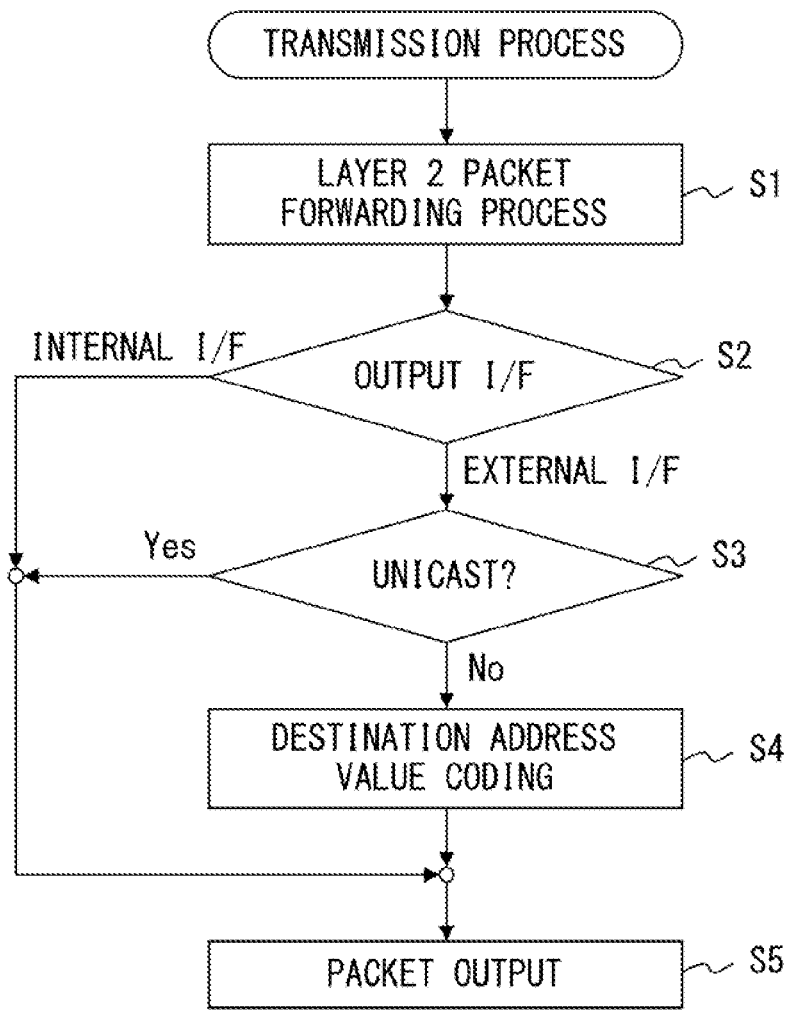
F I G. 7

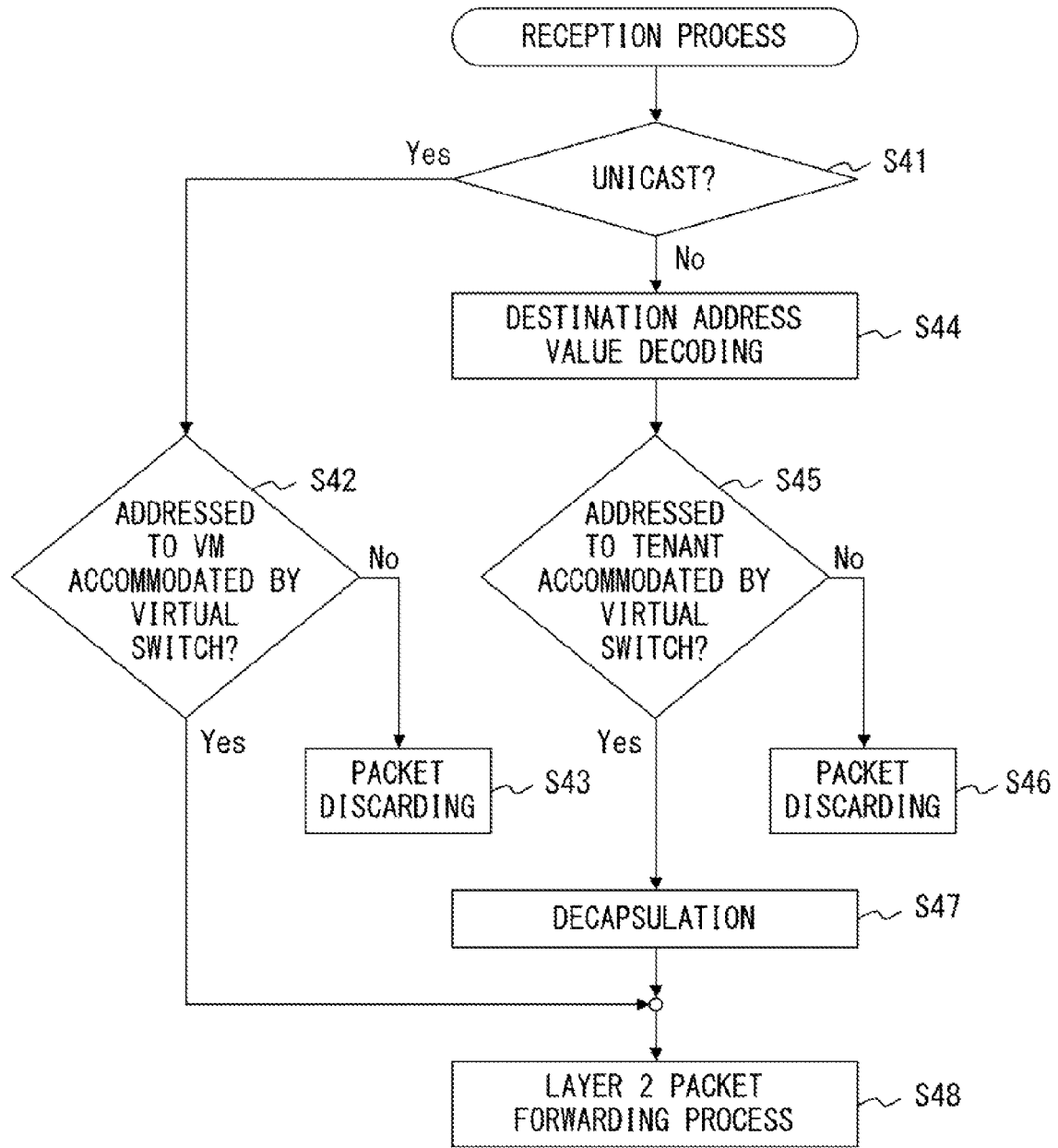
F I G. 1 8

MEDIUM FOR STORING PACKET CONVERSION PROGRAM, PACKET CONVERSION APPARATUS AND PACKET CONVERSION METHOD

CROSS-REFERENCE TO RELATED APPLICATION

This application is based upon and claims the benefit of priority of the prior Japanese Patent Application No. 2011-124661, filed on Jun. 2, 2011, the entire contents of which are incorporated herein by reference.

FIELD

This specification relates to a subnet construction technique.

BACKGROUND

Attention is currently focused on an IaaS (Infrastructure as a Service) of cloud computing as a new application form of ICT (Information and Communication Technology) system construction. The IaaS service constructs a virtual server (hereinafter referred to as a virtual machine or a VM) by using computing resources in a network, and provides the virtual machine to a user as a service. In a cloud computing infrastructure providing such an IaaS service, virtual servers of a plurality of enterprises, divisions or departments (hereinafter referred to generically as tenants) are running. Accordingly, a network environment (hereinafter referred to as a subnet) separated for each tenant is needed to protect security among tenants.

Techniques of constructing a plurality of subnets in one physical Ethernet network include VLAN (Virtual Local Area Network) and PBB (Provider Backbone Bridge).

FIG. 1 is an explanatory view of constructing a network using the VLAN or the PBB technique. Each physical server includes a plurality of virtual machines, and a plurality of virtual switches in units of subnets. Each physical server accommodates, in the same virtual switch, virtual machines that belong to the same subnet. For example, a server 1 includes a VM2, a VM3, and a virtual switch that accommodates the VM2 and the VM3. A server 5 includes a VM6, a VM7, and a virtual switch 8 that accommodates the VM6 and the VM7, and also includes a a VM9, a VM10, and a virtual switch 11 that accommodates the VM9 and the VM10. A server 12 includes a VM13, a VM14, and a virtual switch 15 that accommodates the VM13 and the VM14, and also includes a VM16, a VM17, and a virtual switch 18 that accommodates the VM16 and the VM17.

For example, a subnet that forms a tenant A includes the VM2, the VM3, the VM6 and the VM7. For example, a subnet that forms a tenant C includes the VM9 and the VM10. For example, a subnet that forms a tenant D includes the VM13 and the VM14. For example, a subnet that forms a tenant E includes the VM16 and the VM17.

For example, a network management system not illustrated constructs a network 19 by using the VLAN or the PBB. The network management system is a system of a network including layer 2 switch devices that construct the network 19, and a management apparatus for controlling the layer 2 switch devices.

The network management system sets, for example, physical port/subnet association information as VLAN settings in each of the layer 2 switch devices (L2SWs) 20, 21, 22, 23. The physical port/subnet association information is information indicating to which virtual subnet each physical port of each of the layer 2 switch devices belongs. For example, the layer 2 switch device 22 provided with physical ports (P) 0, 1, 2 includes physical port/subnet association information where the ports P0 and P1 belong to a subnet that forms the tenant A.

Here, a packet includes MACDA, MACSA and a payload. The MACDA stands for Media Access Control (MAC) Destination Address, whereas the MACSA stands for Media Access Control (MAC) Source Address. The payload represents a data portion except for a header including the MACDA, the MACSA and the like.

As illustrated in FIG. 1, the network management system attaches, to a packet that flows in the physical network, a tag (subnet identifier) for identifying a subnet. VID is used as the subnet identifier for the VLAN, whereas I-SID is used as the subnet identifier for the PBB. The packet to which the tag for identifying a subnet is attached is referred to as a VM transmission packet.

For example, upon receiving a packet from the physical server 1 that is a transmission source, the layer 2 switch device 22 references a subnet identifier of the packet, and transfers the packet to a physical port that belongs to the subnet identified based on the subnet identifier. In this case, the subnet identifier of the packet is VLAN-A. Therefore, the layer 2 switch device 22 searches physical port/subnet association information for VLAN-A, and obtains "port 0, port 1" corresponding to VLAN-A. The layer 2 switch device 22 transfers the packet not to the port 0 that has received the packet but to the port 1.

As described above, by using a subnet identifier, a packet is transmitted/received within the same tenant. A subnet is constructed for each subnet identifier. Accordingly, if there are a plurality of subnet identifiers, a plurality of subnets are constructed in one physical network according to the subnet identifiers.

There is another technique of increasing the number of VPNs (Virtual Private Networks) in a Wide Area Ethernet (registered trademark) network. A further technique is a technique for a core network that is configured with a transmission source edge switch, a transmission destination edge switch and one or more core switches, and connects the transmission source edge switch and the transmission destination edge switch. This technique can provide VPNs the number of which exceeds 4096 even if conventional switches that do not support a VLAN stacking technique are used.

Patent Document 1: Japanese Laid-open Patent Publication No. 2009-118127

SUMMARY

A packet conversion program causes a computer having a storing unit to execute the following process. Here, the storing unit stores first association information between a MAC address of a virtual machine connected to a virtual switch and a subnet identifier for identifying a tenant to which the virtual machine belongs. The storing unit also stores second association information between a MAC address representing broadcast or multicast and a packet type identifier. Upon obtaining a packet including the MAC address representing broadcast or multicast from a virtual machine, the computer obtains, based on the first association information, a subnet identifier corresponding to the MAC address of the obtained packet. The computer obtains, based on the second association information, a packet type identifier corresponding to the MAC address of the obtained packet. The computer sets the subnet identifier obtained based on the first association information and the packet type identifier obtained based on the second association information in a field of the MAC address of the packet to be transmitted to a different computer via a network. In this way, the computer converts the packet to be transmitted into a multicast packet. The computer transmits the packet to be transmitted, which is obtained by being converted, to the different computer via the network.

Additionally, a packet conversion program causes a computer having a storing unit to execute the following process. Here, the storing unit stores first association information between a MAC address of a virtual machine connected to a virtual switch and a subnet identifier for identifying a tenant to which the virtual machine belongs. The storing also stores second association information between a MAC address representing broadcast or multicast and a packet type identifier. Upon receiving a multicast packet from a different computer via a network, the computer extracts a subnet identifier and a packet type identifier from a field of a MAC address of the received multicast packet. The computer converts the received packet into an original broadcast or multicast packet by changing a MAC header of the received packet if the extracted subnet identifier has the first association information. The computer then transmits the packet obtained by being converted to the virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates one example of a configuration of a forwarding database in the first embodiment.

FIG. 4 illustrates one example of a configuration of a reception rule table in the first embodiment.

FIG. 5 illustrates one example of an address conversion table in the first embodiment.

FIGS. 6A to 6D illustrate contents of a virtual switch transmission packet in the first embodiment.

FIG. 7 illustrates a flow of operations of a virtual switch when a packet is transmitted in the first embodiment.

FIG. 18 illustrates a flow of operations of a virtual switch when a packet is received in the third embodiment.

DESCRIPTION OF EMBODIMENTS

The VLAN technique standardly supports even a cost-effective layer 2 switch device. With the VLAN technique, however, an address space of VID that is a subnet identifier is of 12 bits. Therefore, the number of subnets that can be constructed in one physical network is limited to 4096. Accordingly, it is difficult to apply the VLAN technique to a data center that accommodates an enormous number of virtual machines.

In contrast, since an address space of I-SID that is a subnet identifier is of 24 bits with the PBB technique, a very large number of subnets can be constructed. However, a layer 2 switch device that supports the PBB technique is very expensive, leading to an increase in a construction cost of a physical network. Similarly, a core network needs to be constructed also with the above described further techniques, leading to an increase in a construction cost of a physical network.

Accordingly, this specification provides a technique of improving the number of subnets that can be constructed in a physical network.

First Embodiment

Figure 1:
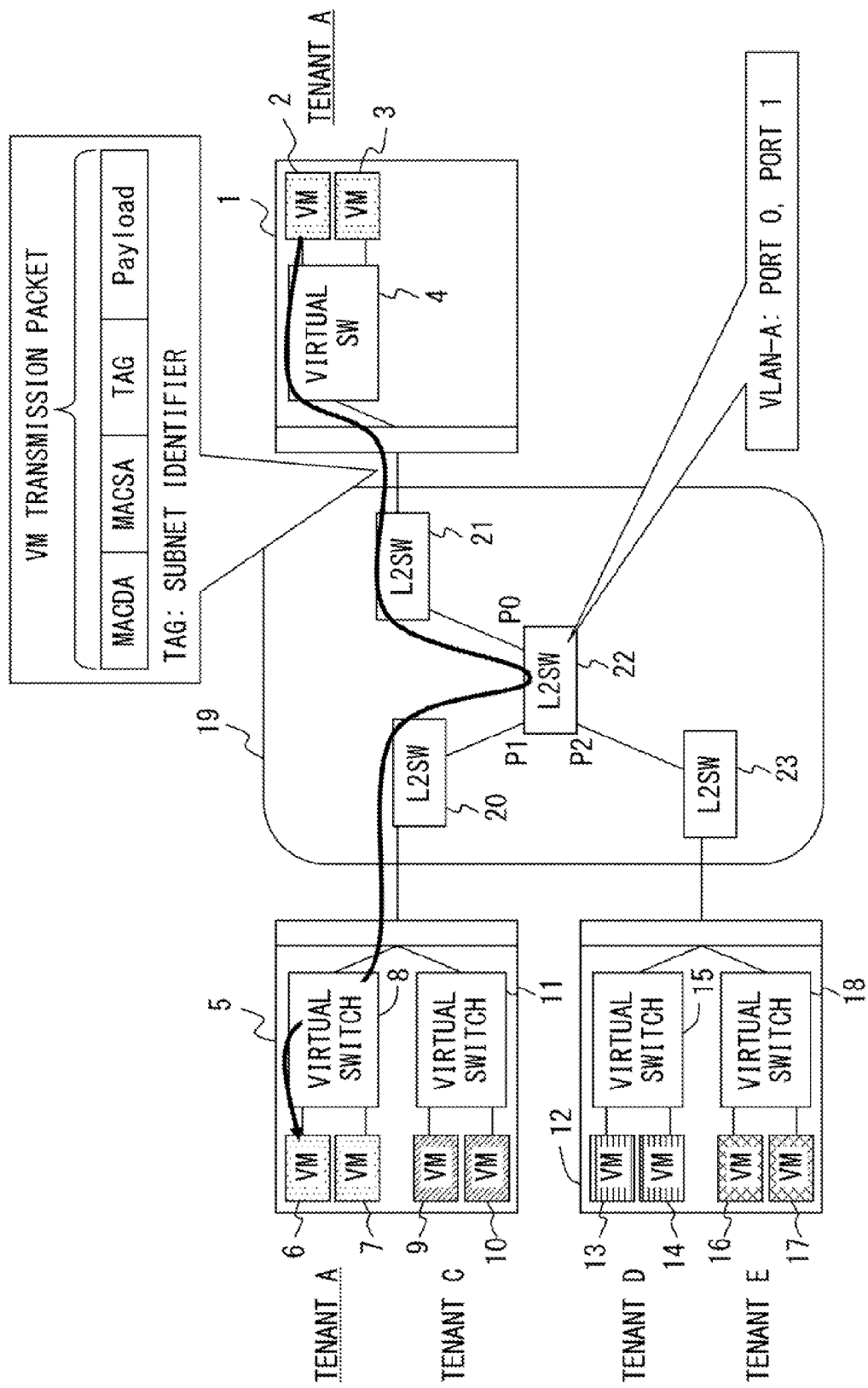
FIG. 1 is an explanatory view of constructing a network using a VLAN or a PBB technique.
Figure 2:
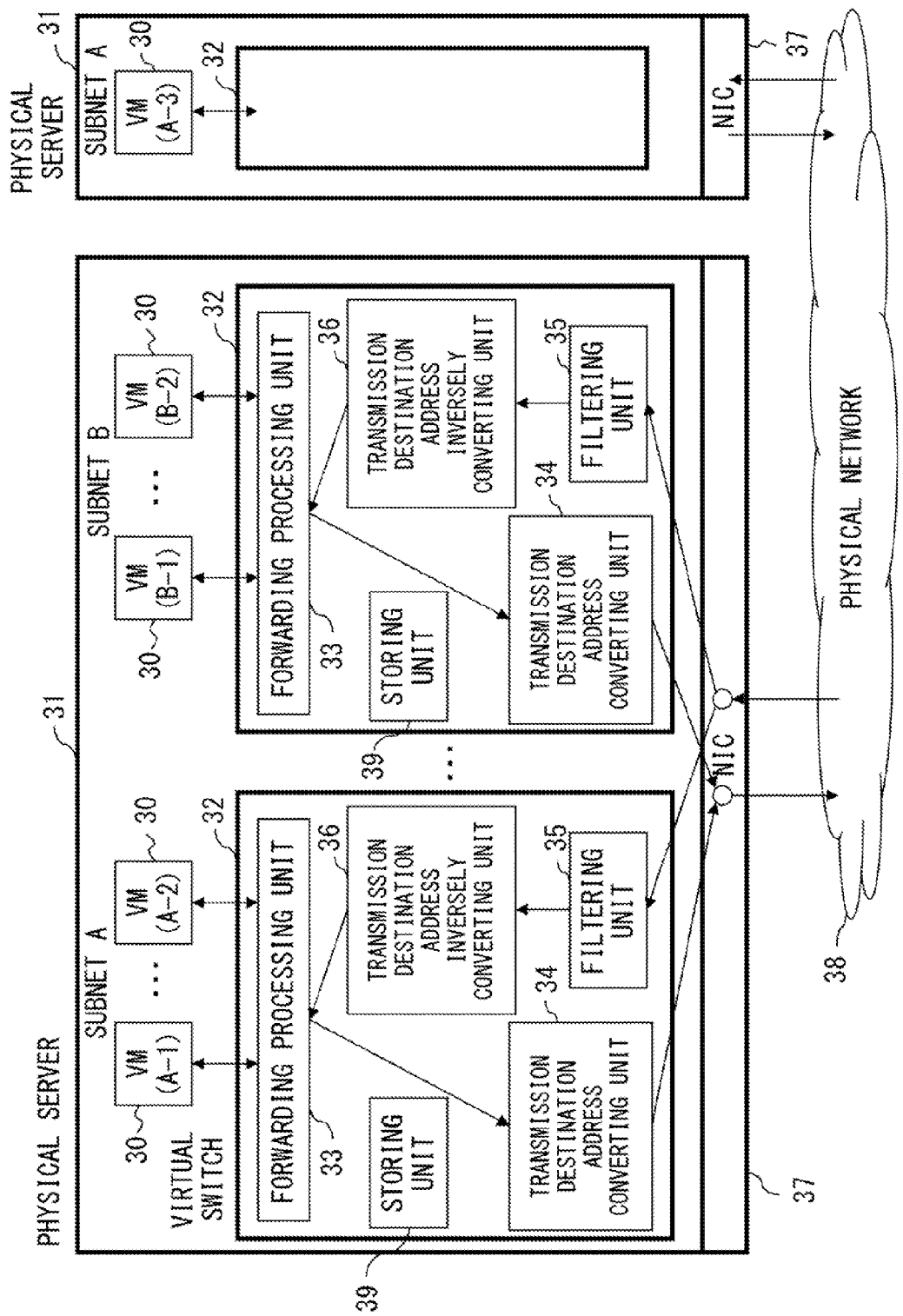
FIG. 2 illustrates one example of physical servers each including virtual switches that respectively accommodate virtual machines in a first embodiment.

FIG. 2 illustrates one example of physical servers each including virtual switches that respectively accommodate virtual machines in this embodiment. Each of the physical servers 31 (31-1, 31-2) includes a plurality of virtual machines 30 (A-1, A-2, . . . , B-1, B-2, . . . ), and a plurality of virtual switches 32 in units of subnets. Each of the physical servers 31 accommodates one or more virtual machines belonging to the same subnet in the same virtual switch.

Each of the virtual switches 32 includes a forwarding processing unit 33, a transmission destination address converting unit 34, a filtering unit 35, a transmission destination address inversely converting unit 36 and a storing unit 39. Each of the virtual switches 32 is a software switch that functions as the forwarding processing unit 33, the transmission destination address converting unit 34, the filtering unit 35 and the transmission destination address inversely converting unit 36.

The forwarding processing unit 33 transfers a packet from a virtual machine to any of ports provided in the virtual switch 32 according to a transmission destination MAC address of a layer 2 header by using a forwarding database (FDB). The FDB is a database where an association between a transmission destination MAC address and output destination port information is described.

The transmission destination address converting unit 34 converts the transmission destination MAC address value of the packet output from the virtual switch 32 to an NIC (Network Interface Card) 37 into a multicast address including a code value and a subnet identifier based on an address conversion table to be described later. The subnet identifier is a subnet identifier corresponding to a tenant to which a virtual machine accommodated by the virtual switch 32 belongs. The NIC 37 is a physical interface connected to a physical network 38.

The filtering unit 35 discards a packet according to a reception rule table when the virtual switch 32 receives the packet from the NIC 37. The reception rule table will be described later.

The transmission destination address inversely converting unit 36 inversely converts a transmission destination address (transmission destination address converted by the transmission destination address converting unit 34) of a packet, which is penetrated by the filtering unit 35, into an original transmission destination address.

The storing unit 39 stores the FDB, the reception rule table, the address conversion table and virtual machine management information. Examples of the FDB, the reception rule table and the address conversion table are illustrated in FIGS. 3 to 5. The virtual machine management information is information for managing virtual machines accommodated by each of the virtual switches 32.

FIG. 3 illustrates one example of a configuration of the forwarding database in this embodiment. The forwarding database (FDB) 41 includes "transmission destination address" 41a and "port name" 41b. The "transmission destination address" 41a is a MAC address of a transmission destination. The "port name" 41b is a port name of a virtual switch, which corresponds to the MAC address.

FIG. 4 illustrates one example of a configuration of the reception rule table 42 in this embodiment. The reception rule table 42 includes reception rule information for enabling reception of a packet addressed to a virtual machine or a tenant permitted to receive the packet. The reception rule information is, for example, a MAC (Media Access Control) address of a virtual machine accommodated by a local virtual switch 32, and a subnet identifier corresponding to a tenant to which a virtual machine accommodated by the local virtual switch 32 belongs.

FIG. 5 illustrates one example of the address conversion table in this embodiment. The address conversion table 43 includes "MAC address" 43a and "Code value" 43b. The "MAC address" 43a is a MAC address of a broadcast packet or a multicast packet, which is to be converted in this embodiment. The "Code value" 43b includes a code value (packet type identifier) for identifying the MAC address 43a.

FIGS. 6A to 6D illustrate contents of a virtual switch transmission packet in this embodiment. The virtual switch transmission packet indicates a packet transmitted from the virtual switch 32. As illustrated in FIG. 6A, the virtual switch transmission packet 45 includes "MACDA (transmission destination MAC address)" 46, "MACSA (transmission source MAC address)" 47, "type" 48 and "Payload" 49.

FIG. 6B illustrates an example of a configuration of a destination MAC address 46 in the case of unicast. The first byte indicates "I/G (Individual/Group) identifier". With the I/G identifier, whether a packet is either a unicast packet or a multicast packet is determined. If the packet is a unicast packet, the least significant bit of the first byte is set to "0". Alternatively, if the packet is a broadcast packet and a multicast packet, the least significant bit of the first byte is set to "1". The second to the sixth bytes indicate a transmission destination virtual machine identifier. As the transmission destination virtual machine identifier, a MAC address of a virtual machine at a transmission destination is set.

FIG. 6C illustrates an example of a configuration of the transmission destination MAC address 46 in the case of broadcast and multicast. The first byte indicates "I/G identifier". The second byte indicates "packet identifier". The third byte indicates "MC (multicast) type". The fourth to the sixth bytes indicate "subnet identifier". As the "packet identifier", information for identifying whether a packet is either a broadcast packet or a multicast packet is set. As the "MC type", information for identifying a type of a multicast packet is set.

FIG. 6D illustrates an example of a configuration of a MAC address 47 of a virtual machine at a transmission source. The first byte indicates "I/G identifier". The second to the sixth bytes indicate "transmission source virtual machine identifier". As the "transmission source virtual machine identifier", a MAC address of a virtual machine at a transmission source is set.

Operations of the virtual switch 32 are described below with reference to FIGS. 7 and 8.

FIG. 7 illustrates a flow of operations of the virtual switch 32 when a packet is transmitted in this embodiment. A packet output from the virtual machine VM(A-1) is transferred to the virtual switch 32.

The virtual switch 32 executes a layer 2 packet forwarding process, and solves an output destination port by using the FDB 41 (S1). Here, the virtual switch 32 initially determines a transmission destination of the packet in a data link layer (second layer) of an OSI (Open Systems Interconnection) reference model (S1).

The virtual switch 32 decides a transmission destination port, namely, an output interface (hereinafter referred to as an output I/F) based on the FDB 41 by referencing a destination MAC address of the packet.

The virtual switch 32 determines whether the decided destination port is either an internal interface (hereinafter referred to as an internal I/F) or an external interface (hereinafter referred to as an external I/F) (S2). The internal I/F indicates a port connected to the other virtual machine VM(A-2) accommodated by the virtual switch 32. The external I/F indicates a port connected to the physical network 38, namely, a port provided in the NIC 37.

If determining that the decided destination port is an internal I/F, the virtual switch 32 transfers the packet to the internal I/F. The virtual switch 32 outputs the packet from the internal I/F (S5).

If determining that the decided destination port is an external I/F, the virtual switch 32 determines whether or not the packet is a broadcast packet or a multicast packet by referencing the I/G identifier of the first byte of the packet (S3).

If determining that the packet is a broadcast packet or a multicast packet in S3, the virtual switch 32 executes a destination address coding process (S4). Here, the virtual switch 32 obtains a MAC address of a virtual machine at a transmission source based on the transmission source MAC address of the packet. The virtual switch 32 obtains a subnet identifier corresponding to the MAC address of the virtual machine at the transmission source from the reception rule table 42. Then, the virtual switch 32 obtains a code value that corresponds to the transmission destination address (broadcast address or multicast address) of the packet from the address conversion table 43. The virtual switch 32 generates a multicast address including the subnet identifier by merging the obtained code value and the above obtained subnet identifier. In this way, the virtual switch 32 converts a transmission destination MAC address of a packet transmitted from a virtual machine into a multicast address including a subnet identifier.

If determining that the packet is a unicast packet in S3, the virtual switch 32 does not execute the conversion process for the transmission destination MAC address of the packet.

The virtual switch 32 outputs, to the physical network 38, the packet determined to be a unicast packet in S3 or the multicast packet the address of which has been converted in S4 as a virtual switch transmission packet (S5).

The layer 2 switch device within the physical network 38 relays the virtual switch transmission packet by executing a packet transfer process. At this time, the virtual switch transmission packet that the virtual switch 32 has converted into the multicast address is relayed as a multicast packet within the physical network 38.

Figure 8:
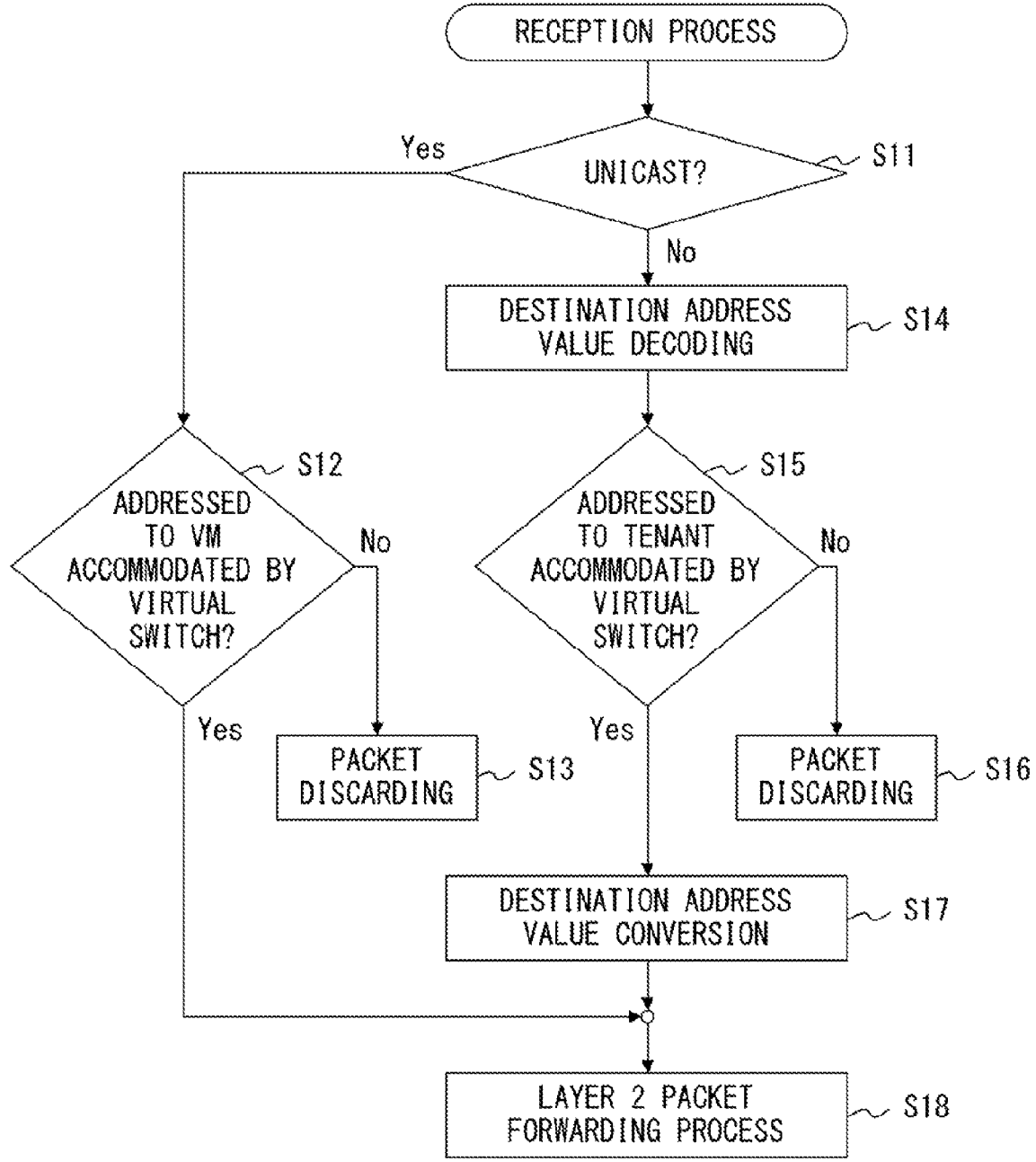
FIG. 8 illustrates a flow of operations of a virtual switch when a packet is received in the first embodiment.

FIG. 8 illustrates a flow of operations of the virtual switch 32 when a packet is received in this embodiment. The physical server 31 receives a virtual switch transmission packet from the physical network 38, and transfers the received packet to each virtual switch 32. The virtual switch 32 determines whether or not the packet is a unicast packet by referencing the I/G identifier of the transferred virtual switch transmission packet (S11).

If determining that the packet is a unicast packet ("YES" in S11), the virtual switch 32 determines whether or not the packet is a packet addressed to a virtual machine accommodated by the local virtual switch (S12). Namely, the virtual switch 32 determines whether or not the transmission destination MAC address of the packet is registered to the reception rule table 42.

If the transmission destination MAC address of the packet is registered to the reception rule table 42 ("YES" in S12), the virtual switch 32 permits reception of the packet. Then, the flow goes to a process of S18. If the transmission destination MAC address of the packet is not registered to the reception rule table 42 ("NO" in S12), the virtual switch 32 discards the packet (S13).

Alternatively, if determining that the packet is not a unicast packet in S11 ("NO" in S11), the virtual switch 32 executes a destination address decoding process (S14). Here, the virtual switch 32 analyzes a subnet identifier included in the transmission destination address of the packet by using the reception rule table 42. Namely, the virtual switch 32 extracts information (subnet identifier) of the fourth to the sixth bytes of the transmission destination address (broadcast address or multicast address) of the packet. The virtual switch 32 searches the reception rule table 42 for the extracted subnet identifier.

If the subnet identifier included in the transmission destination MAC address of the packet is registered to the reception rule table 42 ("YES" in S15), the virtual switch 32 permits reception of the packet. If the subnet identifier included in the transmission destination address of the packet is not registered to the reception rule table 42 ("NO" in S15), the virtual switch 32 discards the received packet (S16). With this filtering process, a subnet that enables a packet to be transmitted to a virtual machine belonging to the same subnet can be constructed.

The virtual switch 32 inversely converts the transmission destination MAC address of the packet (penetrated packet), the reception of which has been permitted in the filtering process, into an original transmission destination MAC address based on a code value included in the transmission destination MAC address based on the address conversion table 43 (S17). Namely, the virtual switch 32 extracts information (code value) of the first to the third bytes of the transmission destination MAC address of the penetrated packet. The virtual switch 32 obtains a broadcast address or a multicast address, which corresponds to the extracted code, from the address conversion table 43. The virtual switch 32 sets the obtained broadcast address or multicast address as the transmission destination MAC address of the penetrated packet.

The virtual switch 32 executes the layer 2 packet forwarding process for the packet inversely converted into the original transmission destination MAC address, and solves an output destination port by using the FDB 41 (S18). The process of S18 is similar to that of S1. The virtual switch 32 transfers the packet inversely converted into the original transmission destination MAC address to the solved output destination port.

As described above, a subnet can be identified based on a subnet identifier included in a MAC address of a packet. Since the subnet identifier included in the MAC address can be represented with three bytes ($2^{24}$ bits), a large address space can be expressed. Accordingly, the technique according to this embodiment can construct many subnets.

Additionally, a packet output from a virtual switch to the physical network 38 is a multicast/unicast packet. Therefore, the physical network 38 can be constructed by using layer 2 switch devices in a physical network infrastructure. As a result, the physical network infrastructure can be cost-effectively implemented.

This embodiment is further described in detail below. A case where a unicast packet is transferred from a virtual machine a1 of one physical server to a virtual machine a4 of another physical server is initially described with reference to FIG. 9.

Figure 9:
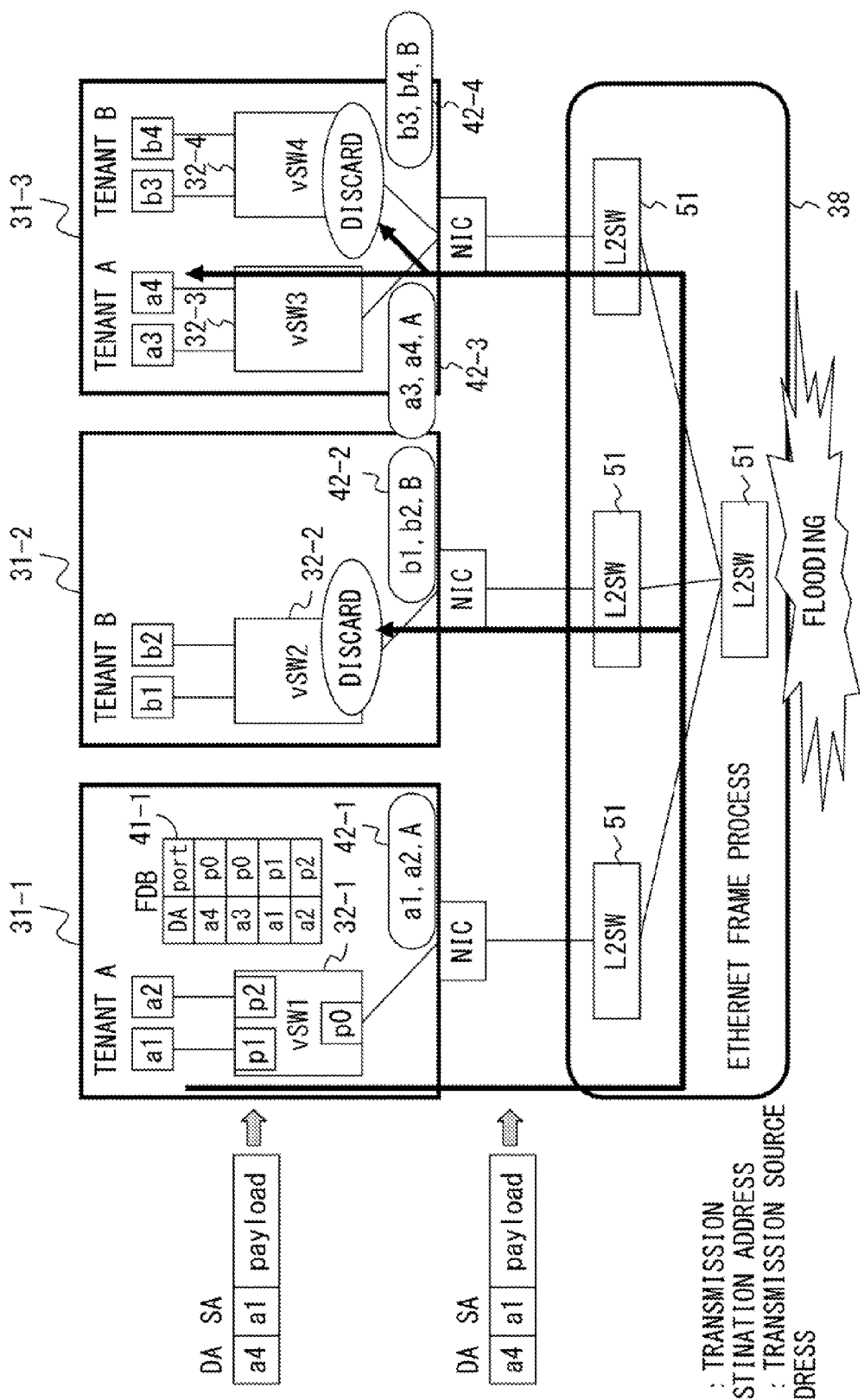
FIG. 9 is an explanatory view of operations of a virtual switch when a unicast packet is received from a virtual machine in the first embodiment.

FIG. 9 is an explanatory view of operations of a virtual switch when a unicast packet is received from the virtual machine in this embodiment. The example of FIG. 9 assumes that virtual machines (a1 to a4, b1 to b4) where one or two tenants (tenant A and/or tenant B) are formed are running in three physical servers 31-1, 31-2, 31-3. Note that the number of physical servers, the number of virtual machines and the number of tenants are not limited in this embodiment. Also assume that the physical servers 31-1, 31-2, 31-3 are connected to the physical network 38 including layer 2 switch devices 51.

Each of the virtual switches (vSW1 to vSW4) includes each of reception rule tables 42-1 to 42-4. For example, the reception rule table 42-1 possessed by the virtual switch (vSW1) includes MAC addresses (respectively represented as a1 and a2 for the sake of convenience) of the virtual machines a1 and a2 accommodated by the virtual switch (vSW1). The reception rule table 42-1 includes a subnet identifier (A) of the tenant to which the virtual machines a1 and a2 belong.

Here, operations performed when a unicast packet is transferred from the virtual machine a1 to the virtual machine a4 are described below. Initially, the virtual machine a1 transmits the packet to the virtual machine a4. At this time, the MAC address (represented as a4 for the sake of convenience) of the virtual machine a4 is set in a field of a transmission destination MAC address of an Ethernet header of the packet. Moreover, a MAC address (represented as a1) of the local virtual machine a1 is set in a field of a transmission source MAC address of the Ethernet header.

The virtual switch (vSW1) decides an output destination port by referencing the transmission destination MAC address field of the unicast packet received from the virtual machine a1, and the FDB 41-1. According to the FDB 41-1 possessed by the virtual switch (vSW1), the output destination corresponding to the address a4 is the port p0 connected to the NIC 37 that is a physical I/F. Accordingly, the virtual switch (vSW1) transfers the packet (virtual switch transmission packet) to the port p0.

The virtual switch transmission packet output to the physical network 38 is relayed by the layer 2 switch device (L2SW) 51 within the physical network 38. This example assumes that information about the MAC address a4 is not registered within the FDB of each of the layer 2 switch devices 51. In this case, the layer 2 switch devices 51 cannot solve the destination port of the MAC address a4. Accordingly, the layer 2 switch devices 51 transfer (flood) the packet to all ports of the physical switches of the local switch devices. As a result, the unicast packet addressed to a4 is transmitted to the physical servers 31-2 and 31-3.

The virtual switches (vSW2, vSW3, vSW4) of the physical servers 31-2 and 31-3 that have received the virtual switch transmission packet from the physical network 38 identify the I/G identifier of the arrived packet.

If the arrived packet is a unicast packet, each of the virtual switches penetrates a packet that matches reception rule information by making a matching between the transmission destination MAC address value of the packet and the reception rule table of the local virtual switch. In this example, the address value a4 is included in the reception rule table 42-3 possessed by the virtual switch (vSW3) of the physical server 31-3. In this case, the virtual switch (vSW3) of the physical server 31-3 penetrates the reception packet.

In contrast, the reception rule tables 42-2 and 42-4 do not include the address value a4. In this case, the virtual switch (vSW2) of the physical server 31-2 and the virtual switch (vSW4) of the physical server 31-3 discard the received packet. Thereafter, the packet penetrated by the virtual switch (vSW3) is transmitted to the virtual machine a4 according to the FDB of the virtual switch (vSW3).

A case where a broadcast packet is transferred from the virtual machine a1 to the virtual machines a2, a3 and a4 that belong to the same tenant is described next with reference to FIG. 10.

Figure 10:
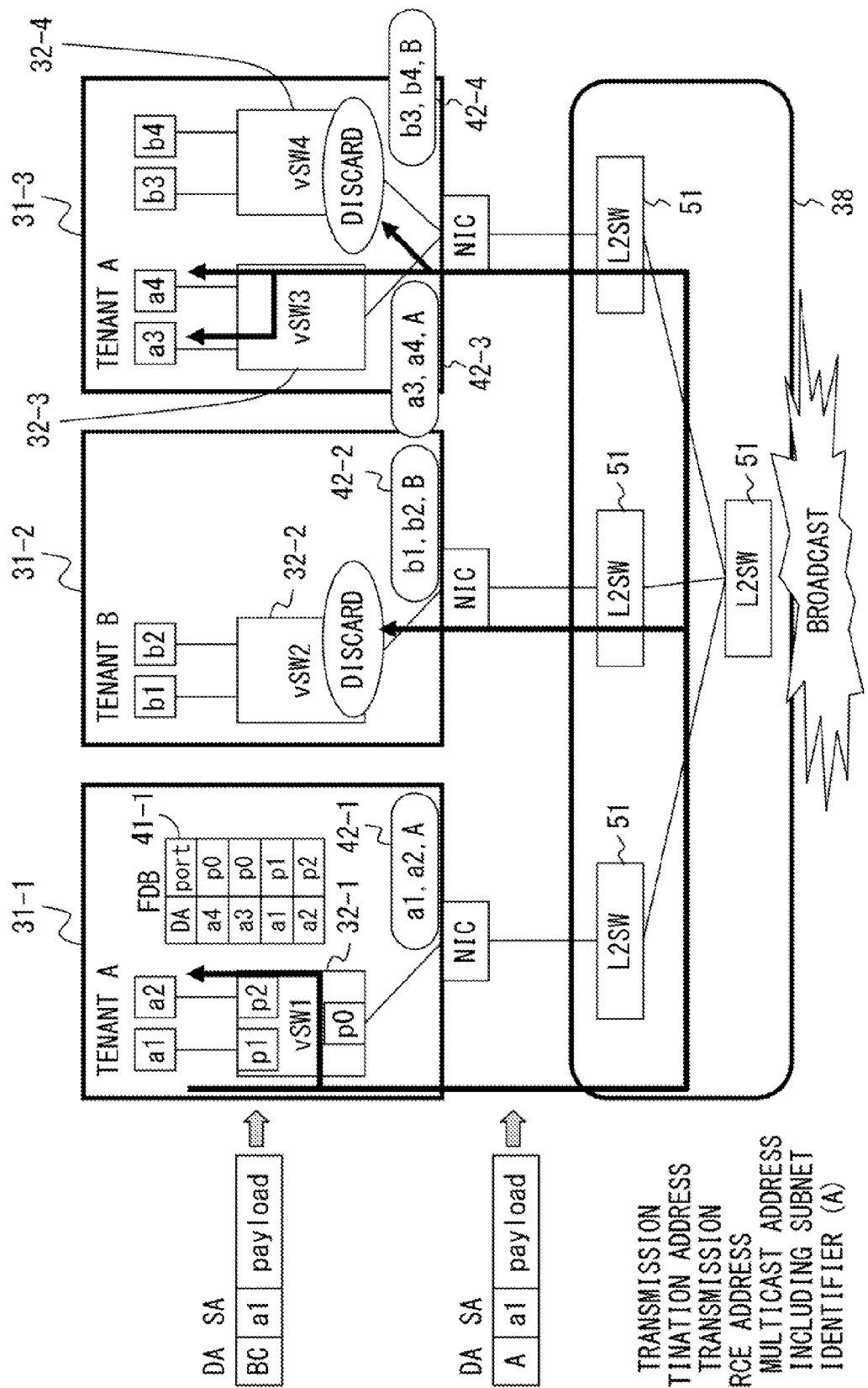
FIG. 10 is an explanatory view of operations of a virtual switch when a broadcast packet (or a multicast packet) is received from a virtual machine in the first embodiment.

FIG. 10 is an explanatory view of operations of a virtual switch when a broadcast packet (or a multicast packet) is received from a virtual machine in this embodiment. The operations of the virtual switch are described by taking, as an example, a case where the virtual machine a1 transmits a broadcast packet.

This example assumes that a MAC address (represented as BC for the sake of convenience) that indicates broadcast is set in the transmission destination MAC address field of the Ethernet header of the packet. Moreover, the MAC address (represented as a1 for the sake of convenience) of the local virtual machine a1 is set in the transmission source MAC address field.

The virtual switch (vSW1) receives the packet transmitted from the virtual machine a1. The received packet is a broadcast packet. Accordingly, the virtual switch (vSW1) transfers the broadcast packet to all the ports of the virtual switch except for the port p1 at which the packet has arrived by using the FDB 41-1. As a result, the broadcast packet arrives at the virtual machine a2.

In contrast, for the broadcast packet transferred to the port p0 connected to the physical network 38, the virtual switch (vSW1) executes the transmission destination address conversion process. The virtual switch (vSW1) converts the transmission destination address of the broadcast packet by using the address conversion table 43. Here, the virtual switch (vSW1) initially obtains, from the address conversion table 43, a code value corresponding to the transmission destination address of the packet to be transferred to the port p0 connected to the physical network 38. In this example, the transmission destination MAC address of the packet is FF-FF-FF-FF-FF-FF that indicates broadcast. In this case, the virtual switch (vSW1) obtains, based on the address conversion table 43, a code value 01-01-00 that corresponds to the MAC address FF-FF-FF-FF-FF-FF.

Next, the virtual switch (vSW1) obtains, based on the reception rule table 42-1, a subnet identifier (A) of the virtual machine accommodated by the local virtual switch. The virtual switch (vSW1) creates data of 6 bytes (01-01-00-00-00-0A) by merging the code value (01-01-00) and the subnet identifier (A). Then, the virtual switch (vSW1) sets the created data in the transmission destination MAC address field of the packet to be output. In this way, the virtual switch transmission packet described with reference to FIGS. 6A to 6D is generated.

The virtual switch (vSW1) transfers, to the physical network 38, the virtual switch transmission packet for which the transmission destination MAC address conversion process has been executed.

In the physical network 38, the layer 2 switch device (L2SW) 51 recognizes that the virtual switch transmission packet is a multicast address packet having the Ethernet frame format illustrated in FIG. 6A. Then, the layer 2 switch device (L2SW) 51 transfers the packet to any of the ports of the local switch by executing the multicast relay process. At this time, the layer 2 switch device (L2SW) 51 floods the multicast packet to all the physical ports in many cases similarly to a broadcast packet. As a result, the multicast packet (originally, the broadcast packet) (virtual switch transmission packet) is transmitted to the physical servers 31-2 and 31-3.

Each of the virtual switches (vSW2, vSW3, vSW4) of the physical servers 31-2 and 31-3 that have received the virtual switch transmission packet from the physical network 38 identifies the I/G identifier of the arrived packet.

If the arrived packet is a multicast packet, each of the virtual switches makes a matching between a subnet identifier stored in the low-order 3 bytes (the fourth to the sixth bytes) of the transmission destination MAC address of the packet and the reception rule table. Each of the virtual switches penetrates a packet that matches reception rule information.

In this example, the subnet identifier (A) is included in the reception rule table 42-3 possessed by the virtual switch (vSW3) of the physical server 31-3. In this case, the virtual switch (vSW3) of the physical server 31-3 penetrates the packet.

In contrast, the subnet identifier (A) is not included in the reception rule table in the virtual switch (vSW2) of the physical server 31-2 and the virtual switch (vSW4) of the physical server 31-2. In this case, the virtual switch (vSW2) of the physical server 31-2 and the virtual switch (vSW4) of the physical server 31-3 discard the packet.

Thereafter, the virtual switch (vSW3) obtains information of high-order 3 bytes (01-01-00 in this example) from the transmission destination address of the penetrated packet. Then, the virtual switch (vSW3) obtains, based on the address conversion table 43, a broadcast address corresponding to the obtained information of 3 bytes.

The virtual switch (vSW3) sets the obtained broadcast address (FF-FF-FF-FF-FF-FF in this example) in the transmission destination MAC address field of the penetrated packet. Thereafter, the virtual switch (vSW3) transfers the broadcast packet to the virtual machines a3 and a4 by executing the packet forwarding process.

As described above, a virtual switch on a transmitting side converts a value of a transmission destination MAC address into a multicast address value including a code value and a subnet identifier if a transmission packet is a broadcast packet or a multicast packet.

A virtual switch on a receiving side relays a packet to a virtual machine accommodated by the local virtual switch by referencing the subnet identifier included in the multicast address of the received packet. As a result, a subnet where a packet arrives at a virtual machine that belongs to a tenant can be constructed.

Since a subnet identifier is mapped onto the low-order 3 bytes (24 bits) of the destination MAC address in this embodiment, $2^{24}$ subnets can be constructed. Moreover, a packet that flows in a physical network has a multicast packet format. Accordingly, a physical network can be constructed, for example, with general-purpose L2SWs, whereby a cost-effective network infrastructure can be constructed.

Additionally, a packet is not transmitted to a virtual machine that belongs to a tenant having a different subnet identifier owing to the filtering function, whereby security of subnets can be improved.

Second Embodiment

In the first embodiment, a multicast or broadcast address value is converted into a multicast address including a code value and a subnet identifier in a virtual switch at a transmission source. Then, appliances in a physical network execute processes by recognizing the packet as a multicast packet. In this case, however, a broadcast packet transmitted by a certain virtual machine arrives at all physical servers within a data center, leading to a possible occurrence of a large volume of wasteful traffic.

Accordingly, in this embodiment, an IGMP (Internet Group Management Protocol) snooping function of a layer 2 switch device is used to perform the following operations. Namely, in this embodiment, a layer 2 switch device is controlled to transmit a virtual switch transmission packet to a physical server including a virtual switch that belongs to a tenant as a multicast member represented with a multicast address value converted by the virtual switch. In this embodiment, the same configurations, processes, functions and the like as those of the first embodiment are denoted with the same reference numerals, and their descriptions are omitted.

Figure 11:
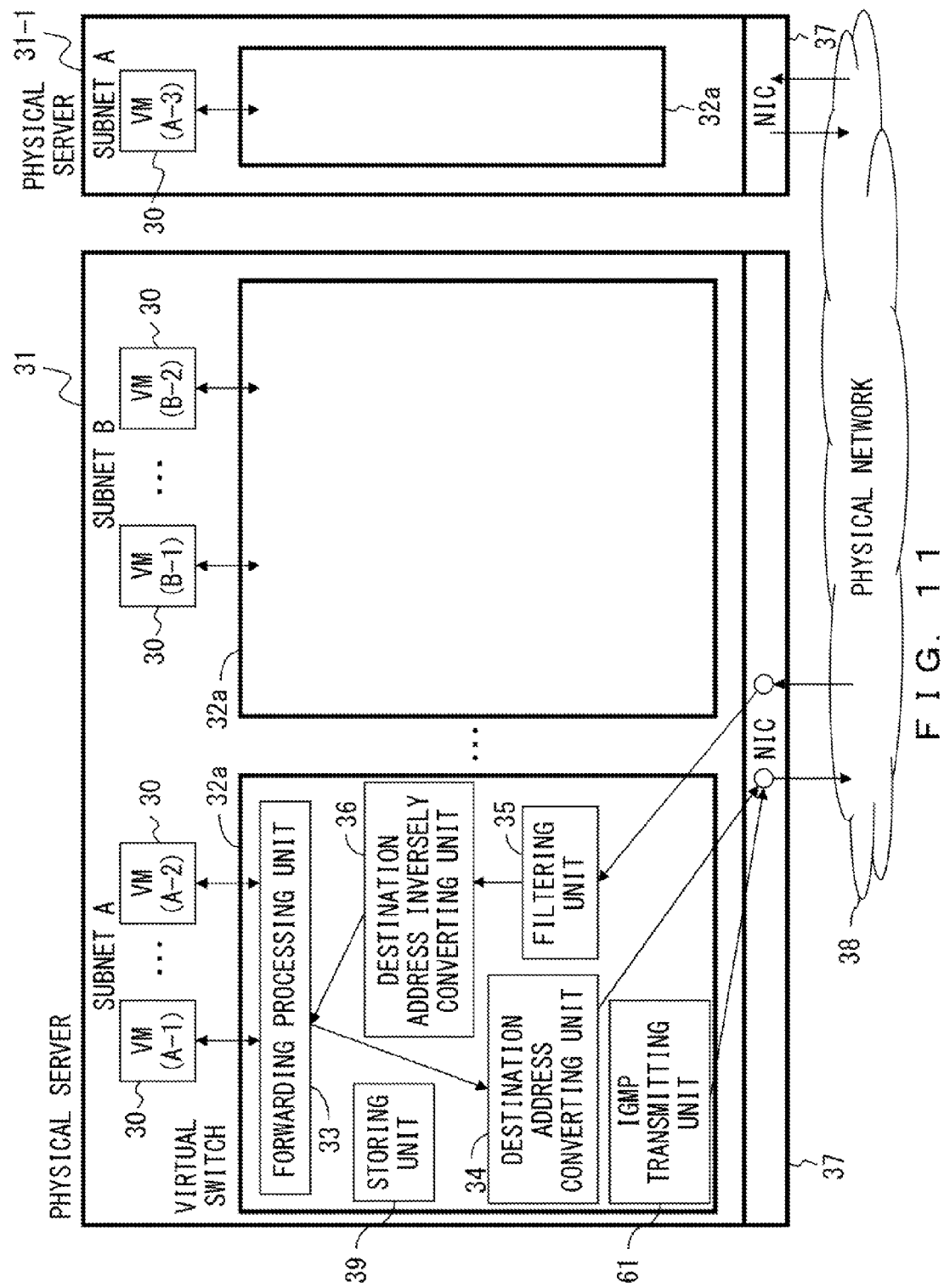
FIG. 11 illustrates one example of physical servers each including virtual switches that respectively accommodate virtual machines in a second embodiment.

FIG. 11 illustrates one example of physical servers each including virtual switches that respectively accommodate virtual machines in this embodiment. The virtual switch 32*a* illustrated in FIG. 11 is a software switch that functions as the forwarding processing unit 33, the transmission destination address converting unit 34, the filtering unit 35, the destination address inversely converting unit 36 and an IGMP transmitting unit 61. The virtual switch 32*a* illustrated in FIG. 11 is implemented by adding the IGMP transmitting unit 61 to the virtual switch 32 of FIG. 2.

The IGMP transmitting unit 61 transmits an IGMP packet to the physical network 38 via the NIC 37 in predetermined cycles. In this case, the IGMP packet is an IGMP Report packet for declaring joining as a multicast member represented with a multicast address including a subnet identifier of a tenant to which a virtual machine accommodated by the virtual switch 32*a* belongs.

Figure 12:
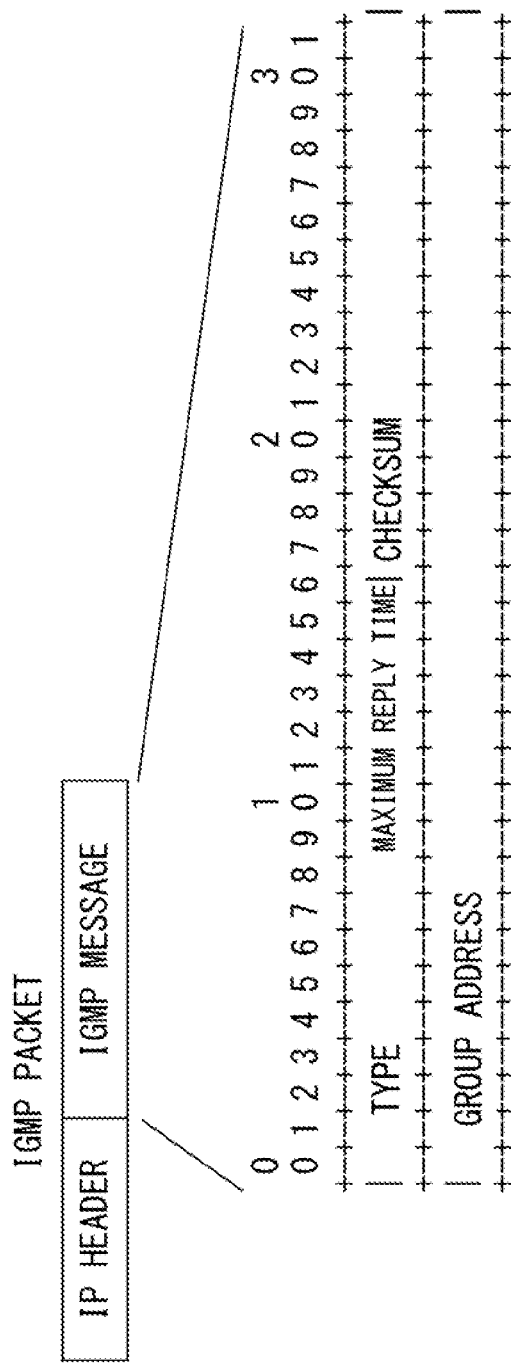
FIG. 12 illustrates a format of an IGMP packet.

FIG. 12 illustrates a format of the IGMP packet. The IGMP packet has an IP (Internet Protocol) header and an IGMP message. The IGMP message has "type", "maximum reply time", "checksum" and "group address". As "type", IGMP message types such as "membership report", "leave group" and the like are set. As "group address", a multicast address that is obtained in the first embodiment and includes a code value and a subnet identifier is stored.

Figure 13:
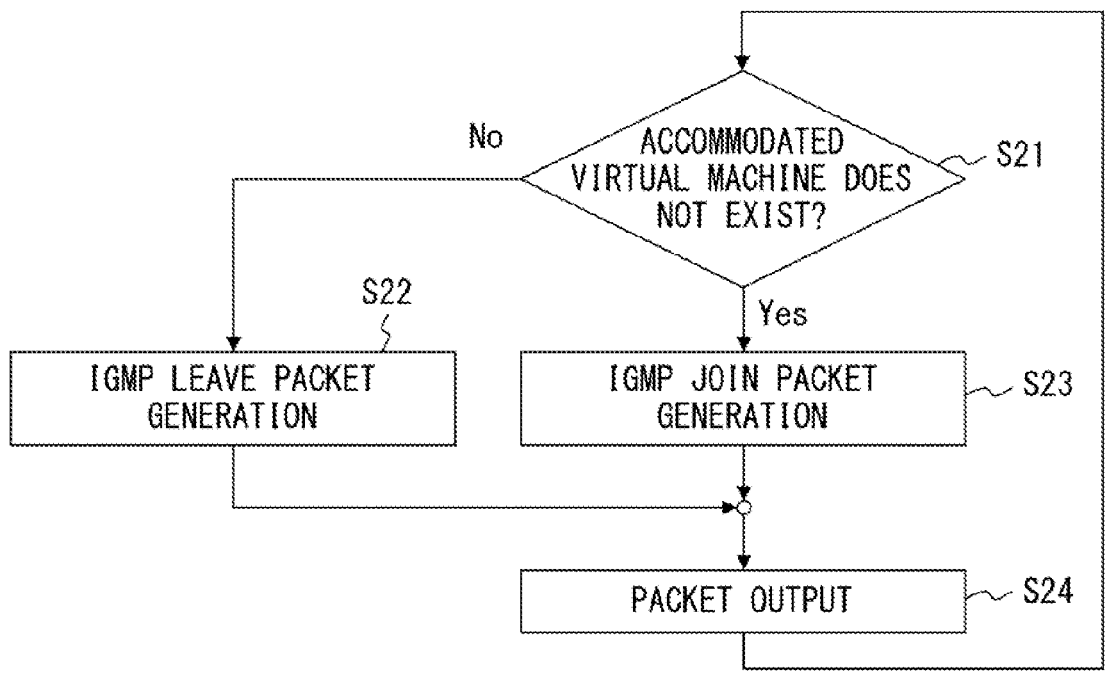
FIG. 13 illustrates one example of a flow of an IGMP packet transmission process in the second embodiment.

FIG. 13 illustrates one example of a flow of an IGMP packet transmission process in this embodiment. The virtual switch 32 transmits an IGMP packet in predetermined cycles. The virtual switch 32*a* executes the process of FIG. 13 each time it transmits an IGMP packet.

Initially, the virtual switch 32*a* determines whether or not a virtual machine accommodated by the local virtual switch 32*a* exists (S21). The virtual switch 32*a* has information (virtual machine management information) for managing virtual machines accommodated by the local virtual switch 32*a*. The virtual machine management information is, for example, information that makes an association between a port name of a virtual machine and a name of the virtual machine connected to the port. The virtual switch 32*a* can determine whether or not a virtual machine accommodated by the local virtual switch 32*a* exists by referencing the virtual machine management information.

If determining that a virtual machine accommodated by the local virtual switch 32*a* does not exist ("NO" in S21), the virtual switch 32 generates an IGMP LEAVE packet for making a virtual machine accommodated by the virtual switch 32*a* leave from a multicast member (S22). At this time, a multicast address that is obtained in the first embodiment and includes a code value and a subnet identifier of the tenant to which the virtual machine accommodated by the virtual switch 32*a* belongs is set as "group address" within the IGMP LEAVE packet.

If determining that a virtual machine accommodated by the virtual switch 32 exists ("YES" in S21), the virtual switch 32*a* generates an IGMP JOIN packet (IGMP packet including the first membership report of joining in the group) (S23). At this time, the multicast address that is obtained in the first embodiment and includes a code value and a subnet identifier of the tenant to which the virtual machine a accommodated by the virtual switch 32 belongs is set as "group address" within the IGMP JOIN packet.

The virtual switch 32*a* transmits the IGMP packet generated in S22 or S23 to the physical network 38 via the NIC 37.

Figure 14:
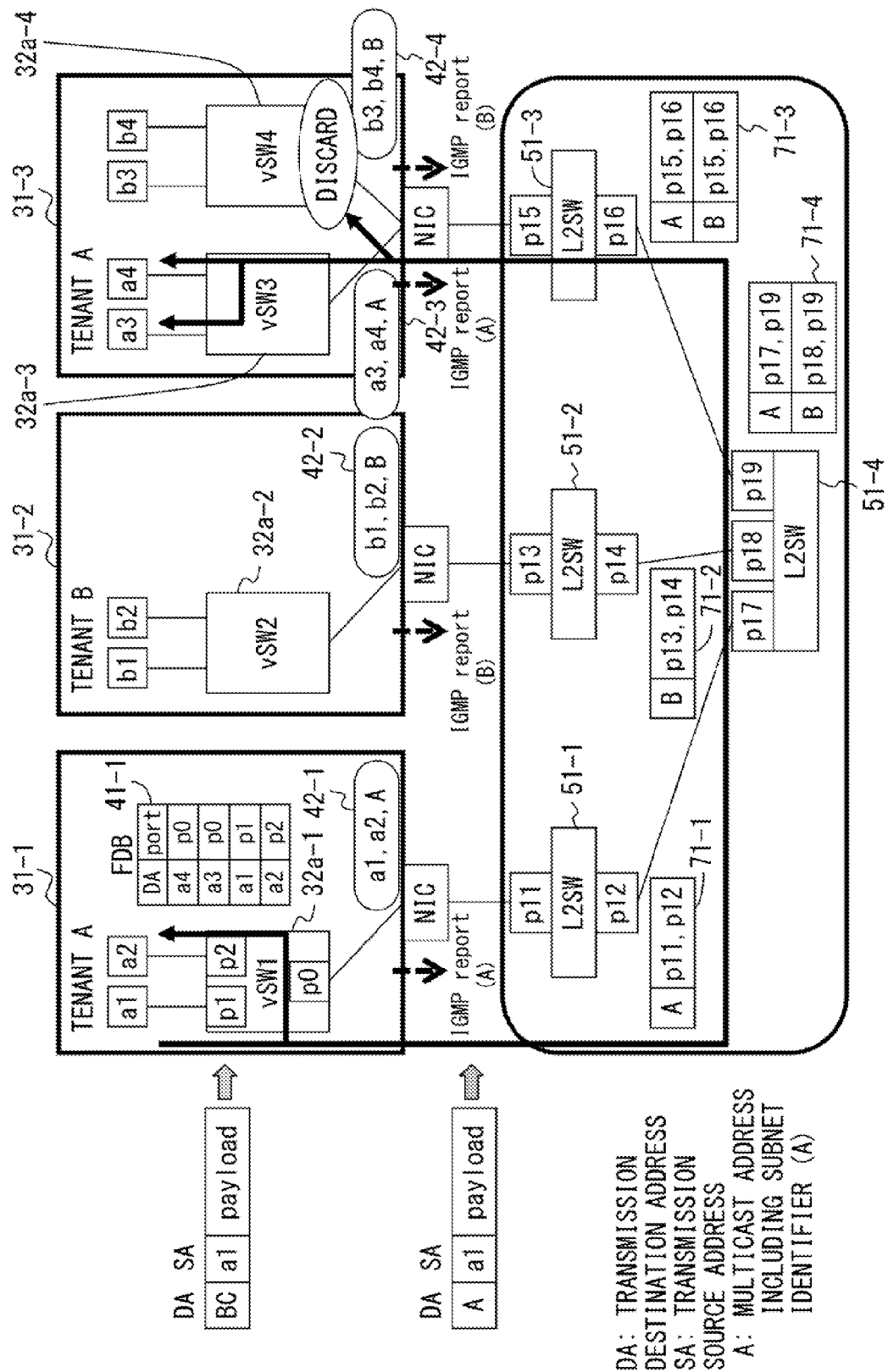
FIG. 14 is an explanatory view of operations of a virtual switch when a broadcast packet (or a multicast packet) is received from a virtual machine in the second embodiment.

FIG. 14 is an explanatory view of operations of a virtual switch when a broadcast packet (or a multicast packet) is received from a virtual machine in this embodiment. An IGMP packet transmitted from each of the virtual switches vSW1 (32*a*–1), vSW2 (32*a*–2), vSW3 (32*a*–3) and vSW4 (32*a*–4) is transmitted to the physical network 38 via the NIC 37 of each of the physical servers 31-1, 31-2 and 31-3.

The layer 2 switch devices (L2SWs) 51-1 to 51-4 have an IGMP snooping function. Each of the layer 2 switch devices (L2SWs) 51 can snoop an IGMP packet that flows through a port of the local switch device by using the IGMP snooping function.

If the received packet is an IGMP report packet, each of the layer 2 switch devices 51-1 to 51-4 executes the following process by using the IGMP snooping function. Namely, each of the layer 2 switch devices (L2SWs) 51-1 to 51-4 obtains a multicast address from the group address field of the IGMP report packet. Then, each of the layer 2 switch devices (L2SWs) 51-1 to 51-4 makes an association between the obtained multicast address and information indicating a port (IGMP reception port) that has received the IGMP report packet, and holds the information in a multicast address/port association table.

For the layer 2 switch device 51-1, a port receiving an IGMP packet that is transmitted from the virtual switch (vSW1) and has multicast address information including the subnet identifier (A) is p11. Moreover, a port receiving an IGMP packet that is transmitted from the virtual switch (vSW3) and has multicast address information including the subnet identifier (A) is p12. Accordingly, in the multicast address/port association table 71-1 of the layer 2 switch device 51-1, the multicast address including the subnet identifier (A) and the IGMP reception ports p11 and p12 are stored by being associated with each other.

For the layer 2 switch device 51-2, a port receiving an IGMP packet that is transmitted from the virtual switch (vSW2) and has a multicast address information including the subnet identifier (B) is p13. Moreover, a port receiving an IGMP packet that is transmitted from the virtual switch (vSW4) and has a multicast address information including the subnet identifier (B) is p14. Accordingly, in the multicast address/port association table 71-2 of the layer 2 switch device 51-1, the multicast address including the subnet identifier (B) and the IGMP reception ports p13 and p14 are stored by being associated with each other.

For the layer 2 switch device 51-3, a port receiving an IGMP packet that is transmitted from the virtual switch (vSW1) and has multicast address information including the subnet identifier (A) is p16. Moreover, a port receiving an IGMP packet that is transmitted from the virtual switch (vSW3) and has multicast address information including the subnet identifier (A) is p15. A port receiving an IGMP packet that is transmitted from the virtual switch (vSW2) and has multicast address information including the subnet identifier (B) is p16. A port receiving an IGMP packet that is transmitted from the virtual switch (vSW4) and has multicast address information including the subnet identifier (B) is p15. Accordingly, in the multicast address/port association table 71-3 of the layer 2 switch device 51-3, the multicast address including the subnet identifier (A) and the IGMP reception ports p15 and p16 are associated with each other and stored. Moreover, in the multicast address/port association table 71-3, the multicast address including the subnet identifier (B) and the IGMP reception ports p15 and p16 are stored by being associated with each other.

For the layer 2 switch device 51-4, a port receiving an IGMP packet that is transmitted from the virtual switch (vSW1) and has multicast address information including the subnet identifier (A) is p17. Moreover, a port receiving an IGMP packet that is transmitted from the virtual switch (vSW3) and has multicast address information including the subnet identifier (A) is p19. A port receiving an IGMP packet that is transmitted from the virtual switch (vSW2) and has multicast address information including the subnet identifier (B) is p18. Moreover, a port receiving an IGMP packet that is transmitted from the virtual switch (vSW4) and has multicast address information including the subnet identifier (B) is p19. Accordingly, in the multicast address/port association table 71-4 of the layer 2 switch device 51-4, the multicast address including the subnet identifier (A) and the IGMP reception ports p17 and p19 are stored by being associated with each other. Moreover, in the multicast address/port association table 71-4, the multicast address including the subnet identifier (B) and the IGMP reception ports p18 and p19 are stored by being associated with each other.

Upon receiving a multicast packet after creating the multicast address/port association table, the layer 2 switch device obtains port information associated with a multicast address from the multicast address/port association table. Then, the layer 2 switch device transfers the multicast packet to the port.

For example, assume that the virtual switch (vSW1) generates a multicast address value (01-01-00-00-00-0A) by merging the code value (01-01-00) indicating a broadcast packet and the subnet identifier (A). Then, the virtual switch (vSW1) sets the generated multicast address value (01-01-00-00-00-0A) in the transmission destination MAC address field of a packet to be output. In this way, the virtual switch transmission packet described with reference to FIG. 6A is generated. The virtual switch (vSW1) transfers the virtual switch transmission packet to the physical network 38.

The layer 2 switch device 51-1 recognizes that the virtual switch transmission packet is a multicast address packet having the Ethernet frame format illustrated in FIG. 6A. Then, the layer 2 switch device 51 searches the multicast address/port association table 71-1 for the multicast address (01-01-00-00-00-0A) of the received packet. Based on search results, the layer 2 switch device 51-1 transfers the received virtual switch transmission packet to the transmission destination port p12 (except for the port p11 at which the packet has arrived).

Also the other layer switch devices 51-4 and 51-3 respectively transfer the received virtual switch transmission packet to a transmission destination port based on the multicast address/port association tables 71-4 and 71-3. As a result, the packet that is transferred from the layer 2 switch device (L2SW) 51-1 and has the multicast address including the subnet identifier (A) is transmitted to the physical server 31-3. In this case, the packet that is transferred from the layer 2 switch device 51-1 and has the multicast address including the subnet identifier (A) is not transmitted to the layer 2 switch device 51-2 and the physical server 31-2.

According to this embodiment, a virtual switch transmits multicast address information including a subnet identifier to a physical network by putting the information on an IGMP report packet. As a result, layer 2 switch devices (L2SWs) of the physical network can recognize to which physical port of the local devices a virtual switch corresponding to a multicast address is connected. As a result, upon receiving a multicast packet, each of the layer 2 switch devices (L2SWs) can transfer the multicast packet to a port that has received an IGMP report packet among ports possessed by the local switch device. Accordingly, for example, a broadcast packet transmitted by a virtual machine of a certain tenant is relayed only to a physical server where a virtual machine belonging to the tenant is running. This can suppress an occurrence of wasteful traffic.

Third Embodiment

In the first embodiment, a value of a transmission destination address of a broadcast packet or a multicast packet transmitted from a virtual machine is converted according to an address conversion table possessed by the virtual switch. However, the number of broadcast or multicast addresses that can be converted depends on a length of the MC type field included in a multicast address after being converted. In the first embodiment, the MC type field has the length of approximately 1 byte (the third byte of FIG. 6C). Therefore, the first embodiment can support only up to 256 types of multicast addresses.

For this reason, the third embodiment achieves the following implementation. Namely, a packet received from a virtual machine is capsulated with a MAC header that includes, as a transmission destination MAC, a multicast address including a preset code value and a subnet identifier. In this embodiment, the same configurations, processes, functions and the like as those of the first or the second embodiment are denoted with the same reference numerals, and their descriptions are omitted.

Figure 15:
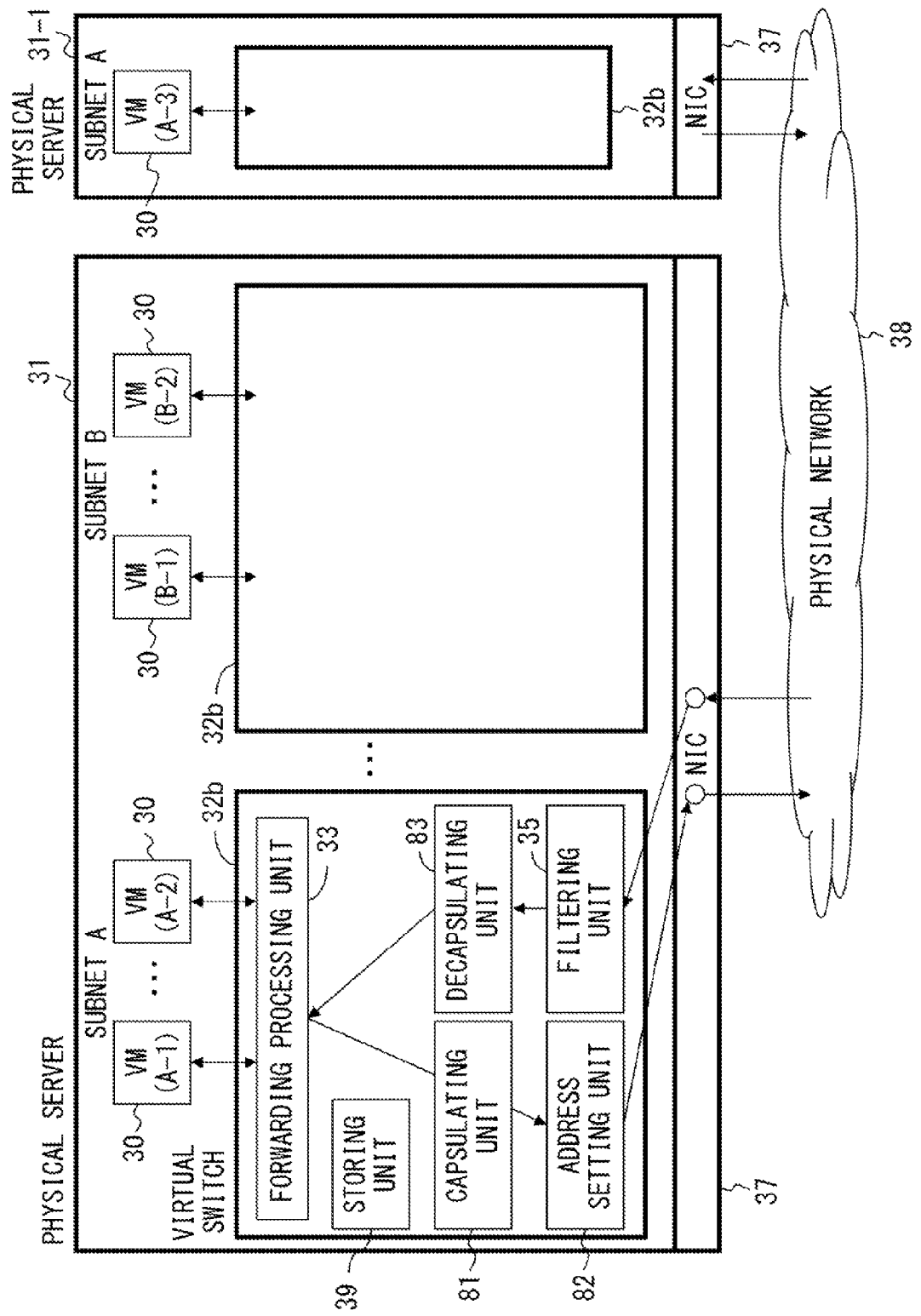
FIG. 15 illustrates one example of physical servers each including virtual switches that respectively accommodate virtual machines in a third embodiment.

FIG. 15 illustrates one example of physical servers each including virtual switches that respectively accommodate virtual machines in this embodiment. The virtual switch 32b is a software switch that functions as the forwarding processing unit 33, an capsulating unit 81, an address setting unit 82, the filtering unit 35 and a decapsulating unit 83.

The capsulating unit 81 adds a new MAC header to a packet to be transferred from the forwarding processing unit 33 to the NIC 37.

The address setting unit 82 sets addresses in the transmission destination MAC address field and the transmission source MAC address field of the added MAC header. If a packet transmitted from a virtual machine is a unicast packet, the address setting unit 82 sets the same value as the transmission destination MAC address of the packet transmitted by the virtual machine in the transmission destination MAC address field of the added MAC header. At this time, the address setting unit 82 sets the MAC address of the local virtual switch 32b in the transmission source MAC address field of the added MAC header.

Alternatively, if the packet transmitted from the virtual machine is a broadcast or multicast packet, the address setting unit 82 performs the following process. Namely, the address setting unit 82 sets a multicast address including a preset code value and a subnet identifier of a tenant to which the virtual machine belongs in the transmission destination MAC address field of the added MAC header. At this time, the address setting unit 82 sets the MAC address of the local virtual switch 32b in the transmission source MAC address field of the added MAC header.

The decapsulating unit 83 deletes the MAC header added to the packet penetrated by the filtering unit 35.

Figures 16A, 16B, 16C, 16D:
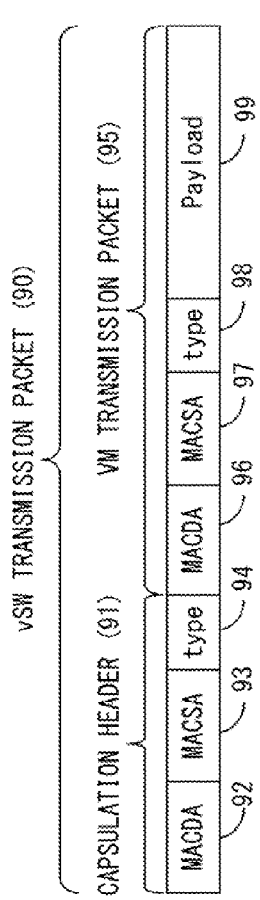
FIGS. 16A to 16D illustrate contents of a virtual switch transmission packet in the third embodiment.

FIGS. 16A to 16D illustrate contents of a virtual switch transmission packet in this embodiment. As illustrated in FIG. 16A, a virtual switch (vSW) transmission packet 90 in this embodiment is a packet implemented by adding an capsulation header (91) to a virtual machine transmission packet (95). The virtual machine transmission packet (95) is a packet that is transmitted from a virtual machine and has "MACDA (transmission destination MAC address)" 96, "MACSA (transmission source MAC address)" 97, "type" 98, and "payload" 99.

The capsulation header (91) has the same format as that of the MAC header. Namely, the capsulation header (91) includes "MACDA (transmission destination MAC address)" 92, "MACSA (transmission source MAC address)" 93 and "type" 94.

FIG. 16B illustrates a configuration example of the transmission destination MAC address 92 of the capsulation header in the case of unicast. FIG. 16C illustrates a configuration example of the transmission destination MAC address 92 of the capsulation header in the case of broadcast and multicast.

FIG. 16D illustrates a configuration example of the transmission source MAC address 93 of the capsulation header. In the transmission source MAC address 93 of the capsulation header, a MAC address of a virtual switch, which is obtained by adding the capsulation header, is set in the second to the sixth bytes as a source virtual switch identifier.

The formats illustrated in FIGS. 16B to 16D are similar to those illustrated in FIGS. 6B to 6D. Therefore, their descriptions are omitted.

Figure 17:
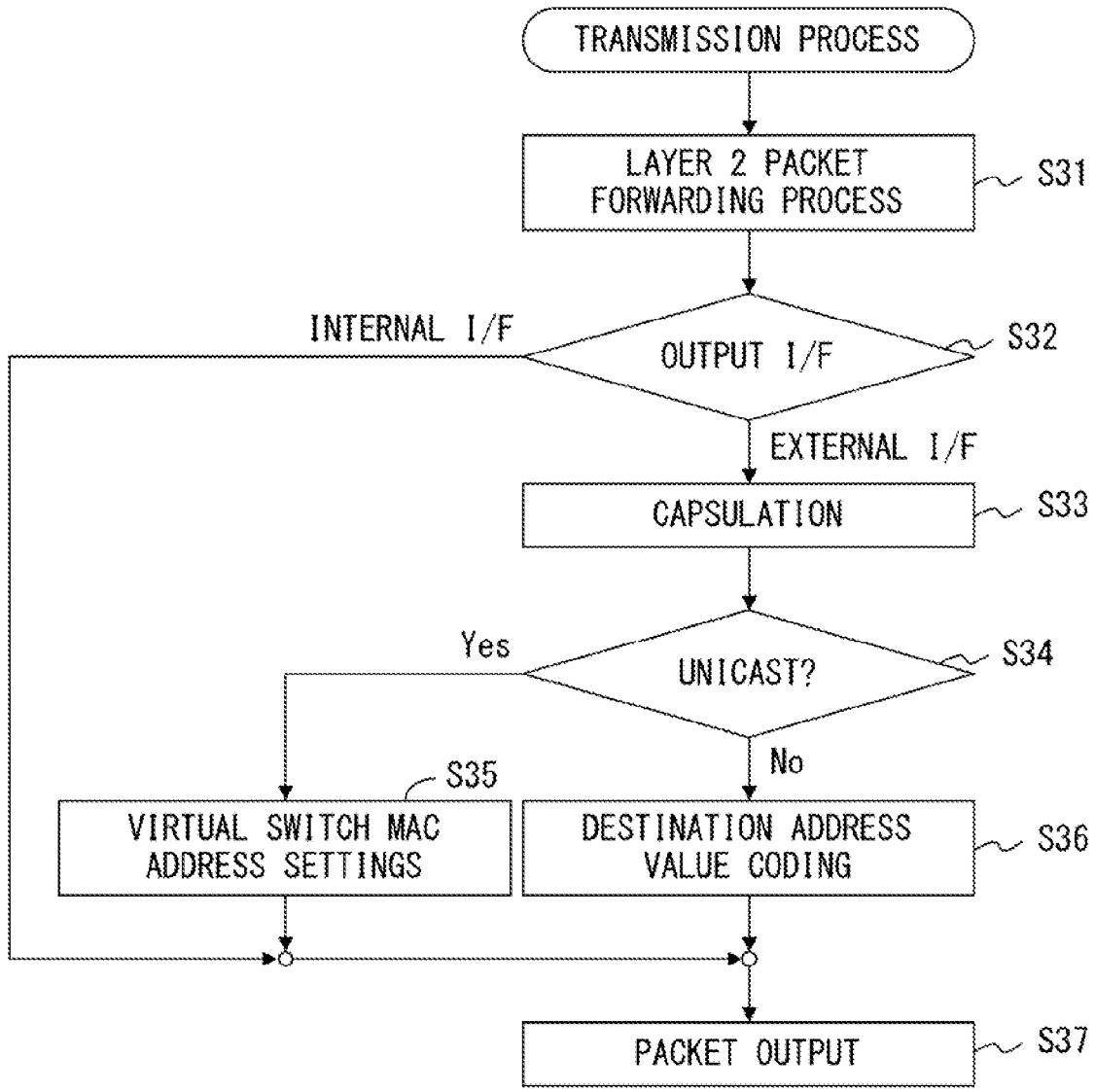
FIG. 17 illustrates a flow of operations of a virtual switch when a packet is transmitted in the third embodiment.

FIG. 17 illustrates a flow of operations of the virtual switch 32 when a packet is transmitted in this embodiment. Upon receiving a packet (virtual machine transmission packet), for example, from the virtual machine (A-1), the virtual switch 32b executes the layer 2 packet forwarding process, and solves an output destination port by using the FDB 41 as described in the first embodiment (S31, S32).

If the solved output destination port is a port connected to the other virtual machine VM (A-2) accommodated by the virtual switch 32b, namely, an internal I/F, the virtual switch 32b transfers the virtual machine transmission packet to the internal I/F. The virtual switch 32b outputs the packet from the internal I/F (S37).

If the solved output destination port is a port (external I/F) connected to the physical network 38, the virtual switch 32b capsulates the virtual machine transmission packet (Ethernet frame) with another MAC header (S33).

The virtual switch 32b determines whether or not the virtual machine transmission packet is a unicast packet by referencing the I/G identifier of the virtual machine transmission packet (S34).

If determining that the packet is a unicast packet, the virtual switch 32b sets the same address as the transmission destination MAC address of the virtual machine transmission packet in the destination address field of the MAC header (capsulation header) added in S33. Moreover, the virtual switch 32b sets the MAC address of the local virtual switch 32b in the transmission source address field of the added MAC header (S35).

If determining that the virtual machine transmission packet is a broadcast or multicast packet, the virtual switch 32b executes a transmission destination address coding process (S36). Here, the virtual switch 32b obtains the MAC address of the virtual machine at the transmission source from the transmission source MAC address of the virtual machine transmission packet. The virtual switch 32 obtains a subnet identifier corresponding to the MAC address of the virtual machine at the transmission source from the reception rule table 42. Then, the virtual switch 32b obtains a code value corresponding to the transmission destination address (broadcast address or multicast address) of the packet from the address conversion table 43. The virtual switch 32b generates a multicast address including a subnet identifier by merging the obtained code value and the above obtained subnet identifier. In this way, the virtual switch 32b converts the transmission destination MAC address of the virtual machine transmission packet into a multicast address including the subnet identifier. Moreover, the virtual switch 32b sets the MAC address of the local virtual switch 32b in the transmission source address field of the added MAC header. In this embodiment, the MAC address of the virtual machine transmission packet is not converted.

Thereafter, the virtual switch 32b outputs the multicast packet set in S35 or the multicast packet (virtual switch transmission packet) set in S36 to the physical network (S37).

FIG. 18 illustrates a flow of operations of the virtual switch 32 when a packet is received in this embodiment. The physical server 31 receives a virtual switch transmission packet from the physical network 38, and transfers the received packet to each of the virtual switches 32. The virtual switch 32b determines whether or not the transferred virtual switch transmission packet is a unicast packet by referencing the I/G identifier of the packet (S41).

If determining that the packet is a unicast packet ("YES" in S41), the virtual switch 32b determines whether or not the packet is a packet addressed to a virtual machine accommodated by the local virtual switch 32b (S42). Namely, the virtual switch 32b determines whether or not the transmission destination MAC address of the packet is registered to the reception rule table 42.

If determining that the transmission destination MAC address of the packet is registered to the reception rule table ("YES" in S42), the virtual switch 32b permits reception of the packet. Then, the flow goes to a process of S47. If the transmission destination MAC address of the received packet is not registered to the reception rule table 42 ("NO" in S42), the virtual switch 32 discards the packet (S43).

Alternatively, if determining that the packet is not a unicast packet ("NO" in S41), the virtual switch 32b executes a transmission destination address decoding process (S44). Here, the virtual switch 32b analyzes the subnet identifier included in the transmission destination address of the packet by using the reception rule table 42. Namely, the virtual switch 32b extracts information (subnet identifier) in the fourth to the sixth bytes of the transmission destination address (broadcast address or multicast address) of the packet. The virtual switch 32b searches the reception rule table 42 for the extracted subnet identifier.

If the subnet identifier included in the transmission destination address of the received packet is registered to the reception rule table 42 ("YES" in S45), the virtual switch 32b permits the reception of the packet. If the subnet identifier included in the transmission destination address of the packet is not registered to the reception rule table 42 ("NO" in S45), the virtual switch 32b discards the packet (S46). With this filtering process, a subnet that enables a packet to arrive at a virtual machine belonging to the same subnet can be constructed.

Next, the virtual switch 32b executes a decapsulation process for the packet, the reception of which has been permitted (penetrated packet) in the filtering process, and deletes the capsulation header (MAC header) of the penetrated packet (S47). As a result, the penetrated packet is restored to a packet before being capsulated, namely, the virtual machine transmission packet.

The virtual switch 32b executes, for example, the layer 2 packet forwarding process for the decapsulated packet as described in the first embodiment, and solves an output destination port by using the FDB 41. The virtual switch 32b transfers the packet after being decapsulated (virtual machine transmission packet) to the solved output destination port (S48).

A case where a unicast packet is transferred from the virtual machine a1 to the virtual machine a4 is described next with reference to FIG. 19.

Figure 19:
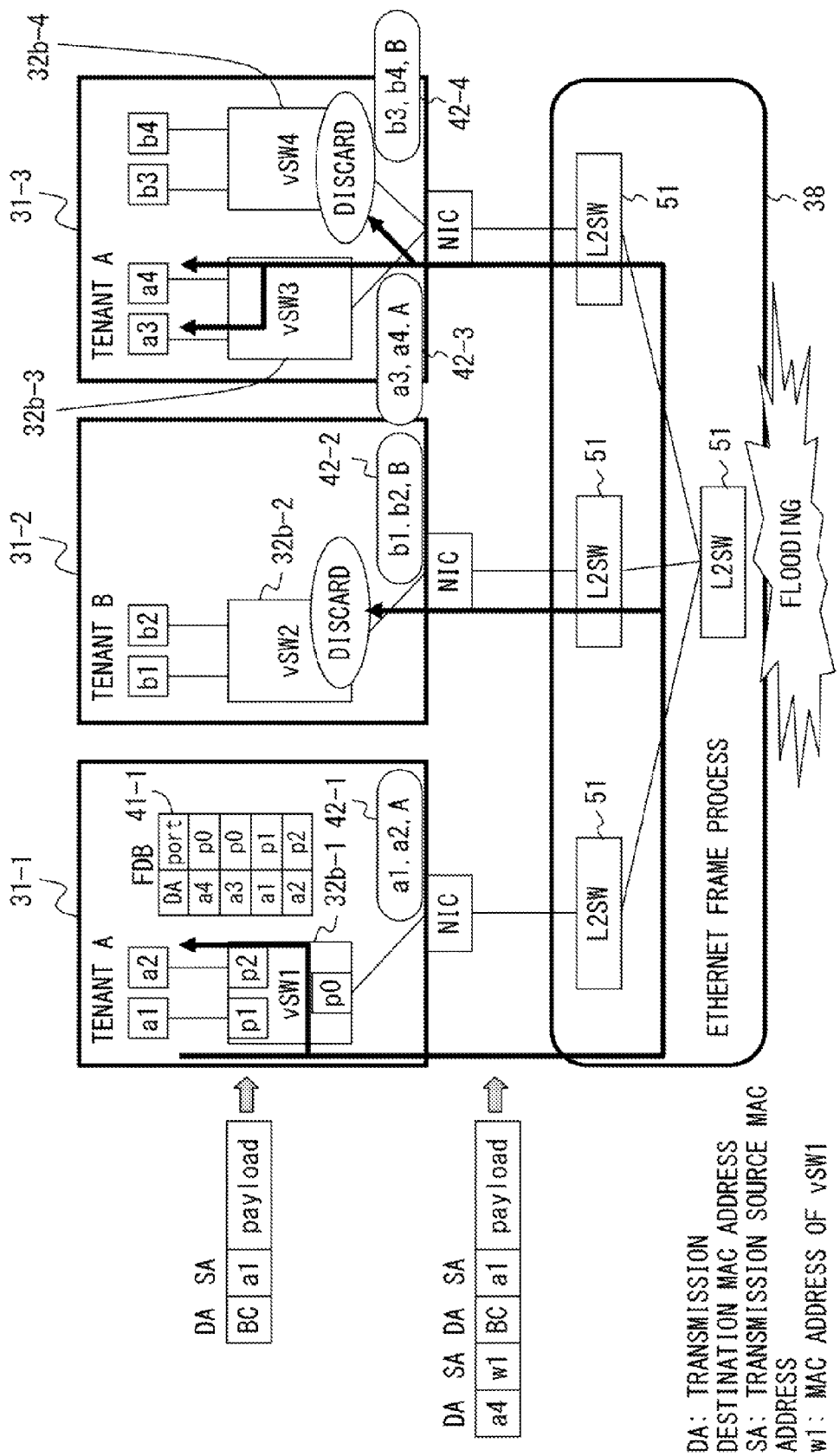
FIG. 19 is an explanatory view of operations of a virtual switch when a unicast packet is received from a virtual machine in the third embodiment.

FIG. 19 is an explanatory view of operations of a virtual switch when a unicast packet is received from a virtual machine in this embodiment. Each of the virtual switches vSW1 (32b-1) to vSW4 (32b-4) is a software switch that functions as the forwarding processing unit 33, the capsulating unit 81, the address setting unit 82, the filtering unit 35 and the decapsulating unit 83.

Initially, the virtual machine a1 transmits the unicast packet to the virtual machine a4. In this case, the MAC address (represented as a4 for the sake of convenience) of the virtual machine a4 is set in the destination MAC address field of the Ethernet header of the packet. Moreover, the MAC address (represented as a1 for the sake of convenience) of the local virtual machine a1 is set in the source MAC address field of the Ethernet header.

The virtual switch (vSW1) decides an output destination port by referencing the transmission destination MAC address field of the unicast packet (virtual machine transmission packet) received from the virtual machine a1, and the FDB 41-1. According to the FDB 41-1 possessed by the virtual switch (vSW1), the output destination corresponding to the address a4 is the port p0 connected to the NIC that is a physical interface. Accordingly, the virtual switch (vSW1) transfers the packet to the port p0.

At this time, the virtual switch (vSW1) adds a new MAC header (capsulation header) to the virtual machine transmission packet. At this time, the virtual switch (vSW1) sets the transmission destination address (a4) of the virtual machine transmission packet in the transmission destination address field of the capsulation header. Moreover, the virtual switch (vSW1) sets the MAC address (represented as vSW1 for the sake of convenience) of the local virtual switch in the transmission source address field of the capsulation header. The virtual switch (vSW1) transmits the packet (virtual switch transmission packet) after the addresses are set to the physical network.

The capsulation header portion of the virtual switch transmission packet is referenced by the layer 2 switch devices (L2SWs) 51 within the physical network 38, and relayed to any of output ports. This embodiment assumes that information about the MAC address a4 is not registered to the FDB of the layer 2 switch devices 51. In this case, the layer 2 switch devices (L2SWs) 51 cannot solve a destination port. Accordingly, the layer 2 switch devices 51 transfer (flood) the packet to all the ports of the physical switches of the local switch devices. As a result, the unicast packet addressed to the virtual machine a4 is transmitted to the physical servers 31-2 and 31-3.

The virtual switches (vSW2, vSW3, vSW4) of the physical servers 31-2 and 31-3 that have received the virtual switch transmission packet from the physical network 38 identify the I/G identifier of the arrived packet.

If the arrived packet is a unicast packet, each of the virtual switches penetrates a packet that matches reception rule information by making a matching between the transmission destination MAC address value of the capsulation header portion of the packet and the reception rule table of the local virtual switch. In this example, the reception rule table 42-3 possessed by the virtual switch (vSW3) of the physical server 3 includes the address value a4. Therefore, the virtual switch vSW3 of the physical server 31-3 penetrates the received packet. In contrast, the virtual switch (vSW2) of the physical server 31-2 and the virtual switch (vSW4) of the physical server 31-3 discard the received packet.

Thereafter, the virtual switch (vSW3) executes the decapsulation process to delete the capsulation header from the penetrated packet. Then, the virtual switch (vSW3) executes the packet forwarding process to transfer the decapsulated packet (virtual machine transmission packet (unicast packet) before being capsulated) to the virtual machine a4.

A case where a broadcast packet is transferred from the virtual machine a1 to the virtual machines a2, a3 and a4 belonging to the same tenant is described next.

Figure 20:
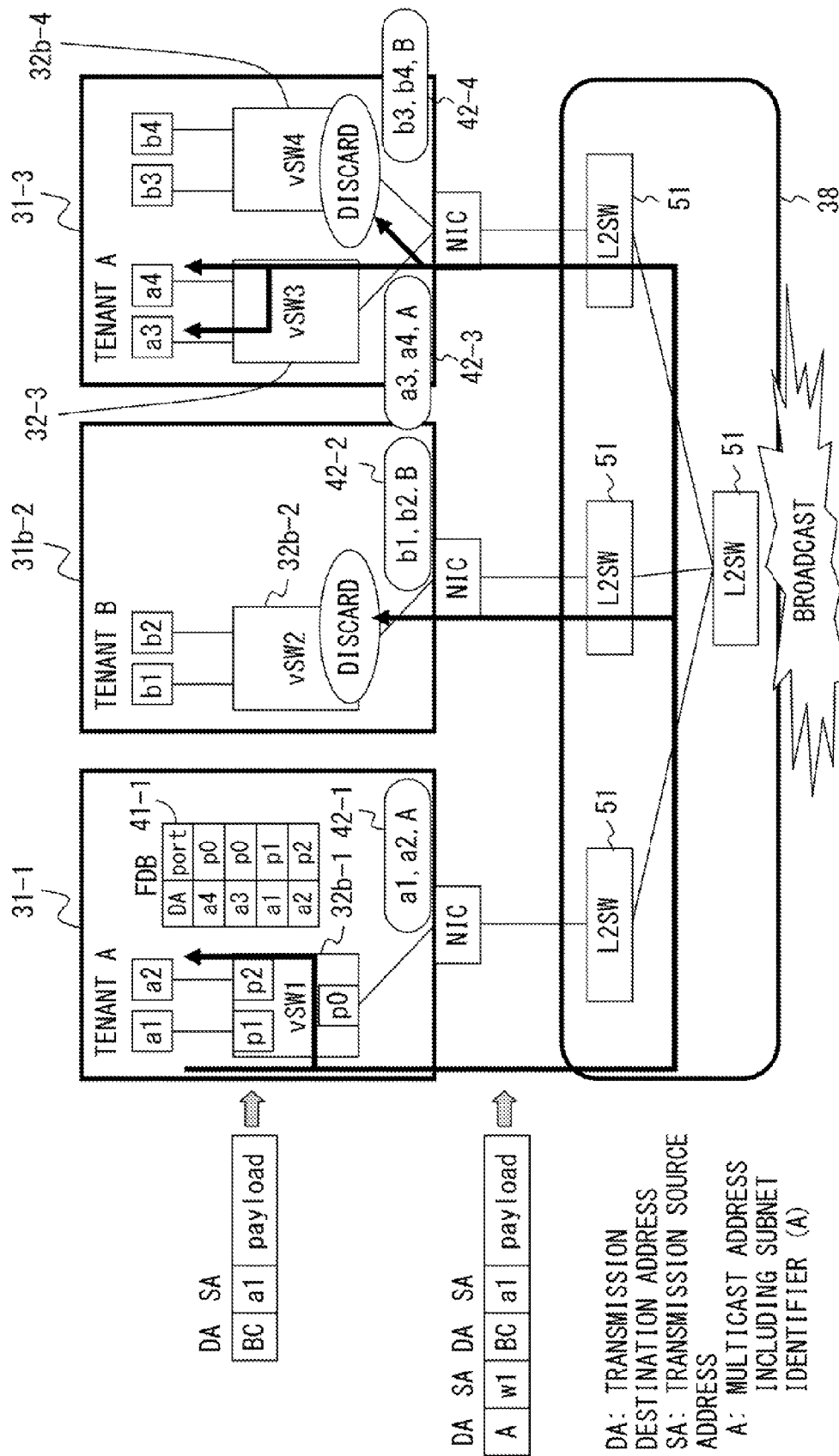
FIG. 20 is an explanatory view of operations of a virtual switch when a broadcast packet (or a multicast packet) is received from a virtual machine in the third embodiment.

FIG. 20 is an explanatory view of operations of a virtual switch when a broadcast packet (or a multicast packet) is received from a virtual machine in this embodiment. The operations are described by taking, as an example, a case where the virtual machine a1 transmits the broadcast packet.

In this example, a MAC address (represented as BC for the sake of convenience) indicating broadcast is set in the transmission destination MAC address field of the Ethernet header of the packet. Moreover, the MAC address (represented as a1 for the sake of convenience) of the local virtual machine is set in the transmission source MAC address field of the Ethernet header.

The virtual switch (vSW1) receives the packet (virtual machine transmission packet) transmitted from the virtual machine a1. The received packet is a broadcast packet. Therefore, the virtual switch (vSW1) transfers the broadcast packet to all the ports of the virtual switch except for the port p1 at which the packet has arrived by using the FDB 41-1. As a result, the broadcast packet arrives at the virtual machine a2.

In contrast, the virtual switch (vSW1) adds a new MAC header to the broadcast packet transferred to the port p0 connected to the physical network.

The virtual switch (vSW1) sets the MAC address of the local virtual switch (vSW1) in the transmission source address field of the added MAC header (capsulation header).

Additionally, the virtual switch (vSW1) sets the following address in the transmission destination address field of the capsulation header. Here, the virtual switch (vSW1) initially obtains the subnet identifier (A) of the virtual machine accommodated by the local virtual switch based on the reception rule table 42-1. The virtual switch (vSW1) then creates data of 6 bytes (such as 01-01-00-00-00-0A) by merging a preset code value (such as 01-01-00) and the subnet identifier (A). Here, the preset code value is not particularly limited as far as the value is at least a code of 3 bytes identifiable as being broadcast or multicast in the I/G identifier. Note that the code value may be set in the address conversion table 43.

Then, the virtual switch (vSW1) sets the created data of 6 bytes in the transmission destination MAC address field of the capsulation header. As a result, the virtual switch transmission packet described with reference to FIGS. 16A to 16D is generated.

The virtual switch transmission packet generated with the above described process is transferred from the port p0 to the physical network 38. The layer 2 switch devices (L2SWs) 51 of the physical network 38 recognize that the virtual switch transmission packet is a multicast address packet having the Ethernet frame format. Then, the layer 2 switch devices (L2SWs) 51 transfer the packet to any of the ports of the local layer 2 switch device by executing the multicast relay process. At this time, the layer 2 switch devices (L2SWs) 51 flood the capsulated packet to all the physical ports in many cases similarly to a broadcast packet. As a result, the multicast packet (virtual switch transmission packet) is transmitted to the physical servers 31-2 and 31-3.

The virtual switches (vSW2, vSW3, vSW4) of the physical servers 31-2 and 31-3, which have received the packet from the physical network 38, identify the I/G identifier of the arrived packet.

If the arrived packet is a multicast packet, each of the virtual switches makes a matching between a subnet identifier stored in the low-order three bytes (the fourth to the sixth bytes) of the transmission destination MAC address value within the capsulation header of the packet and the reception rule table. Each of the virtual switches penetrates a packet that matches reception rule information.

In this example, the reception rule table 42-3 possessed by the virtual switch (vSW3) of the physical server 31-3 includes the subnet identifier (A). In this case, the virtual switch vSW3 of the physical server 31-3 penetrates the packet.

In contrast, in the virtual switch (vSW2) of the physical server 31-2 and the virtual switch (vSW4) of the physical server 31-3, the subnet identifier (A) is not included in the reception rule table. In this case, the virtual switch (vSW2) of the physical server 31-2 and the virtual switch (vSW4) of the physical server 31-3 discard the packet.

The virtual switch (vSW3) executes the decapsulation process to delete the capsulation header portion from the penetrated packet. Thereafter, the virtual switch (vSW3) transfers the penetrated packet after being decapsulated (broadcast packet before being capsulated, namely, the virtual machine transmission packet) to the virtual machines a3 and a4.

A new Ethernet header is added as described above in this embodiment, whereby a packet transmitted from a virtual machine is transferred by being penetrated in a network.

Accordingly, a constraint to the number of multicast addresses as in the first embodiment can be avoided.

Figure 21:
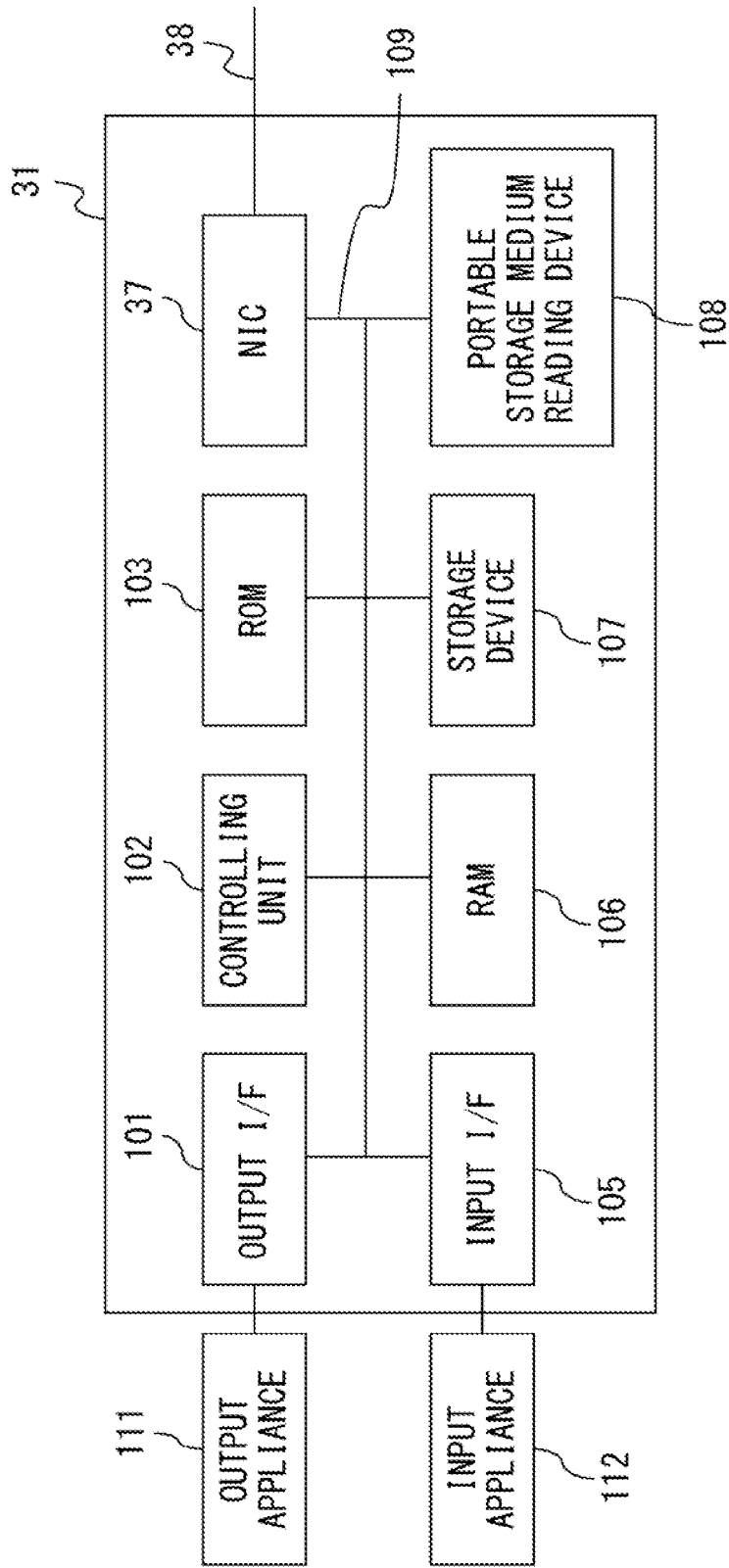
FIG. 21 illustrates one example of a block diagram of a hardware configuration of the physical server in the first to the third embodiments.

FIG. 21 illustrates one example of a block diagram of a hardware configuration of a physical server in the first to the third embodiments. The physical server 31 is configured by including a controlling unit 102, a ROM 103, a RAM 106, a NIC 37, a storage device 107, an output I/F 101, an input I/F 105, a reading device 108, a bus 109, an output appliance 111, and an input appliance 112. The ROM stands for Read Only Memory. The RAM stands for Random Access Memory. The I/F stands for an interface.

To the bus 109, the controlling unit 102, the ROM 103, the RAM 106, the NIC 37, the storage device 107, the output I/F 101, the input I/F 105, the reading device 108 and the like are connected. The reading device 108 is a device for reading a portable storage medium. The output appliance 111 is connected to the output I/F 101. The input appliance 112 is connected to the input I/F 105.

As the storage device 107, storage devices of various forms, such as a hard disk drive, a flash memory device, a magnetic disc device and the like are available. The RAM 106 is used, for example, as a working area for temporarily storing data.

In the storage device 107 or the ROM 103, for example, information of a program or the like, such as an operating system (OS) and the like, are stored. Also software for implementing a virtual machine, a virtual switch and the like, the FDB 41, the reception rule table 42, the address conversion table and the like are stored in the storage device 107 or the ROM 103.

The controlling unit 102 is a processing unit for reading and executing a program that is stored in the storage device 107 or the like and for implementing processes to be described later.

The program for implementing the operations of a virtual switch described in this embodiment may be stored, for example, in the storage device 107 via the physical network 38 and the NIC 37 from a program provider side. Alternatively, the program for implementing the processes described in embodiments to be described later may be stored on a marketed and distributed portable storage medium. In this case, the portable storage medium is set in the reading device 108, and the controlling unit 102 may read and execute the program. As the portable storage medium, storage media of various forms, such as a CD-ROM, a flexible disc, an optical disc, a magneto-optical disk, an IC card, a USB memory device and the like, are available. The program stored in such storage media is read by the reading device 108.

Additionally, as the input appliance 112, a keyboard, a mouse, an electronic camera, a web camera, a microphone, a scanner, a sensor, a tablet, a touch panel and the like are available. Moreover, as the output appliance 11, a display, a printer, a speaker and the like are available. The physical network 38 may be a communications network such as the Internet, LAN, WAN, a dedicated line network, a wired network, a wireless network or the like.

According to the first to the third embodiments, a packet conversion program causes a computer having a storing unit to execute the following process. Here, the storing unit stores first association information between a MAC address of a virtual machine connected to a virtual switch and a subnet identifier for identifying a tenant to which the virtual machine belongs. The storing unit also stores second association information between a MAC address representing broadcast or multicast and a packet type identifier. Upon obtaining a packet including a MAC address representing broadcast or multicast from a virtual machine, the computer obtains a subnet identifier corresponding to the MAC address of the obtained packet based on the first association information. The computer further obtains a packet type identifier corresponding to the MAC address of the obtained packet based on the second association information. The computer sets the subnet identifier obtained based on the first association information and the packet type identifier obtained based on the second association information in the MAC address field of a packet to be transmitted to a different computer via a network. In this way, the computer converts the packet to be transmitted into a multicast packet. The computer transmits the packet to be transmitted, which is obtained by being converted, to the different computer via the network. One example of the first association information is the reception rule table 42. One example of the second association information is the address conversion table. One example of the storing unit is the storing unit 39. One example of the packet type identifier is a code value. One example of converting a packet to be transmitted into a multicast packet is the process of S4 or S36.

With such a configuration, an address space of a MAC header is effectively utilized to expand an address space of a subnet identifier, whereby the number of subnets that can be constructed in a physical network can be increased.

Additionally, the packet to be transmitted is, for example, a packet obtained from a virtual machine. When converting the packet to be transmitted into a multicast packet, the computer sets a subnet identifier obtained based on the first association information and a packet type identifier obtained based on the second association information in the MAC address field of the obtained packet. In this way, the computer converts the obtained packet into a multicast packet.

With such a configuration, an address space of a subnet identifier can be expanded.

The packet conversion program further causes the computer to execute a process for adding a MAC header to the packet obtained from the virtual machine. The packet to be transmitted is, for example, a packet to which the MAC header is added. When converting the packet to be transmitted into a multicast packet, the computer sets the subnet identifier obtained based on the first association information and a packet identifier representing broadcast or multicast in the MAC address field of the added MAC header. In this way, the computer converts the packet to which the MAC header is added into a multicast packet.

With such a configuration, a constraint to the number of multicast addresses can be avoided.

The packet conversion program further causes the computer to execute the following process. Namely, the computer transmits joining declaration information for joining as a multicast member indicated with a multicast address represented by the subnet identifier obtained based on the first association information and the packet type identifier obtained based on the second association information.

With such a configuration, a packet is relayed only to a physical server where a virtual machine of the same tenant is running, whereby an occurrence of wasteful traffic can be suppressed.

Additionally, a packet conversion program further causes a computer having a storing unit to execute the following process. Here, the storing unit stores first association information between a MAC address of a virtual machine connected to a virtual switch and a subnet identifier for identifying a tenant to which the virtual machine belongs. The storing unit also stores second association information between a MAC address representing broadcast or multicast and a packet type identifier. Upon receiving a multicast packet from a different computer via a network, the computer extracts a subnet identifier and a packet type identifier from the MAC address field of the received packet. If the extracted subnet identifier has the first association information, the computer converts the received packet into an original broadcast or multicast packet by changing the MAC header of the received packet. The computer transmits the packet obtained by being converted to the virtual machine. One example of converting the received packet into the original broadcast or multicast packet is the process of S17 or S47.

With such a configuration, the address space of the MAC header is effectively utilized to expand the address space of the subnet identifier, whereby the number of subnets that can be constructed in a physical network can be increased.

When converting the received packet into the original broadcast or multicast packet, the computer obtains a MAC address corresponding to the extracted packet type identifier based on the second association information. The computer converts the received packet into the original broadcast or multicast packet by setting the obtained MAC address in the MAC address field of the received packet.

With such a configuration, the address space of the subnet identifier can be expanded.

When converting the received packet into the original broadcast or multicast packet, the computer validates a second MAC address by deleting a first MAC address of the received packet. In this way, the computer converts the received packet into the original broadcast or multicast packet.

With such a configuration, the constraint to the number of multicast addresses can be avoided.

Additionally, the computer discards the received packet if the extracted subnet identifier does not have the first association information.

As a result, a packet is not transmitted to a virtual machine that belongs to a tenant having a different subnet identifier, whereby security of subnets can be improved.

According to the technique disclosed in this specification, the number of subnets that can be constructed in a physical network can be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing a packet conversion program for causing a computer, which has a storing unit configured to store first association information between a MAC address of a virtual machine connected to a virtual switch and a subnet identifier for identifying a subnet to which the virtual machine belongs, and second association information between a MAC address representing a broadcast address or a multicast address and a packet type identifier to perform procedures, the procedures comprising:

obtaining a packet including the MAC address representing the broadcast address or the multicast address from the virtual machine;

obtaining, from the first association information, the subnet identifier corresponding to the MAC address of the obtained packet;

obtaining, from the second association information, the packet type identifier corresponding to the MAC address of the obtained packet;

converting the obtained packet into a multicast packet by setting the subnet identifier obtained from the first association information and the packet type identifier obtained from the second association information in a field of the MAC address of the obtained packet; and transmitting the converted packet to a different computer via a network.

2. The non-transitory computer-readable medium according to claim 1, the procedures further comprising:

transmitting joining declaration information to declare joining a multicast member indicated by a multicast address, the multicast address being represented by the subnet identifier obtained from the first association information and the packet type identifier obtained from the second association information.

3. A non-transitory computer-readable medium storing a packet conversion program for causing a computer, which has a storing unit configured to store first association information between a MAC address of a virtual machine connected to a virtual switch and a subnet identifier for identifying a subnet to which the virtual machine belongs, and second association information between a MAC address representing a broadcast address or a multicast address and a packet type identifier to perform procedures, the procedures comprising:

obtaining a packet including the MAC address representing the broadcast address or the multicast address from the virtual machine;

obtaining, from the first association information, the subnet identifier corresponding to the MAC address of the obtained packet;

obtaining, from the second association information, the packet type identifier corresponding to the MAC address of the obtained packet;

adding a MAC header to the obtained packet;

converting the packet to which the MAC header is added into a multicast packet by setting the subnet identifier obtained from the first association information and the packet identifier representing broadcast or multicast in a field of a MAC address of the added MAC header; and transmitting the converted packet to a different computer via a network.

4. A non-transitory computer-readable medium storing a packet conversion program for causing a computer, which has a storing unit configured to store first association information between a MAC address of a virtual machine connected to a virtual switch and a subnet identifier for identifying a subnet to which the virtual machine belongs, and second association information between a MAC address representing a broadcast address or a multicast address and a packet type identifier to perform procedures, the procedures comprising:

receiving a multicast packet from a different computer via a network;

extracting the subnet identifier and the packet type identifier from a field of a MAC address of the received multicast packet;

obtaining, from the second association information, the MAC address corresponding to the extracted packet type identifier when the first association information includes the extracted subnet identifier;

converting the received packet into an original broadcast or multicast packet by setting the obtained MAC address in the field of the MAC address of the received packet; and transmitting the converted packet to the virtual machine.

5. The non-transitory computer-readable medium according to claim 4, the procedures further comprising:

discarding the received packet when the first association information does not include the extracted subnet identifier.

6. A non-transitory computer-readable medium storing a packet conversion program for causing a computer, which has a storing unit configured to store first association information between a MAC address of a virtual machine connected to a virtual switch and a subnet identifier for identifying a subnet to which the virtual machine belongs, and second association information between a MAC address representing a broadcast address or a multicast address and a packet type identifier to perform procedures, the procedures comprising:

receiving a multicast packet from a different computer via a network;

extracting the subnet identifier and the packet type identifier from a field of a MAC address of the received packet;

converting the received packet into an original broadcast or multicast packet by validating a second MAC address with deletion of a first MAC address of the received packet when the first association information includes the extracted subnet identifier; and transmitting the converted packet to the virtual machine.

7. A packet conversion apparatus comprising:

a storing unit that stores first association information between a MAC address of a virtual machine connected to a virtual switch and a subnet identifier for identifying a subnet to which the virtual machine belongs, and second association information between a MAC address representing a broadcast address or a multicast address and a packet type identifier;

a first obtaining unit that obtains a packet including the MAC address representing the broadcast address or the multicast address from the virtual machine, and obtains, from the first association information, the subnet identifier corresponding to the MAC address of the obtained packet;

a second obtaining unit that obtains, from the second association information, the packet type identifier corresponding to the MAC address of the packet;

a converting unit that converts the obtained packet into a multicast packet by setting the subnet identifier obtained from the first association information and the packet type identifier obtained from the second association information in a field of a MAC address of the obtained packet; and a transmitting unit that transmits the converted packet, to a different computer via a network.

8. The packet conversion apparatus according to claim 7, further comprising a joining declaring unit that transmits joining declaration information to declare joining a multicast member indicated by a multicast address, the multicast address being represented by a subnet identifier obtained from the first association information and a packet type identifier obtained from the second association information.

9. A packet conversion apparatus comprising:

a storing unit that stores first association information between a MAC address of a virtual machine connected to a virtual switch and a subnet identifier for identifying a subnet to which the virtual machine belongs, and second association information between a MAC address representing a broadcast address or a multicast address and a packet type identifier;

a first obtaining unit that obtains a packet including the MAC address representing the broadcast address or the multicast address from the virtual machine, and obtains, from the first association information, the subnet identifier corresponding to the MAC address of the obtained packet;
a second obtaining unit that obtains, from the second association information, the packet type identifier corresponding to the MAC address of the obtained packet;
an adding unit that adds a MAC header to the obtained packet;
a converting unit that converts the obtained packet to which the MAC header is added into a multicast packet by setting the subnet identifier obtained from the first association information and the packet identifier representing broadcast or multicast in the field of the MAC address of the added MAC header; and
a transmitting unit that transmits the converted packet to a different computer via a network.

10. A packet conversion apparatus comprising:
a storing unit that stores first association information between a MAC address of a virtual machine connected to a virtual switch and a subnet identifier for identifying a subnet to which the virtual machine belongs, and second association information between a MAC address representing a broadcast address or a multicast address and a packet type identifier;
an extracting unit that receives a multicast packet from a different computer via a network, and extracts the subnet identifier and the packet type identifier from a field of a MAC address of the received multicast packet;
a converting unit that obtains, from the second association information, the MAC address corresponding to the extracted packet type identifier when the first association information includes the extracted subnet identifier, and converts the multicast packet into an original broadcast or multicast packet by setting the obtained MAC address in the field of the MAC address of the received packet; and
a transmitting unit that transmits the converted packet to the virtual machine.

11. The packet conversion apparatus according to claim 10, wherein the extracting unit discards the received packet when the first association information does not include the extracted subnet identifier.

12. A packet conversion apparatus comprising:
a storing unit that stores first association information between a MAC address of a virtual machine connected to a virtual switch and a subnet identifier for identifying a subnet to which the virtual machine belongs, and second association information between a MAC address representing a broadcast address or a multicast address and a packet type identifier;
an extracting unit that receives a multicast packet from a different computer via a network, and extracts the subnet identifier and the packet type identifier from a field of a MAC address of the received packet;
a converting unit converts the received packet into an original broadcast or multicast packet by validating a second MAC address with deletion of a first MAC address of the received packet when the first association information includes the extracted subnet identifier; and
a transmitting unit that transmits the converted packet to the virtual machine.

13. A packet conversion method for causing a computer, which has a storing unit configured to store first association information between a MAC address of a virtual machine connected to a virtual switch and a subnet identifier for identifying a subnet to which the virtual machine belongs, and second association information between a MAC address representing a broadcast address or a multicast address and a packet type identifier, the packet conversion method comprising:
obtaining a packet including the MAC address representing the broadcast address or the multicast address from the virtual machine;
obtaining, from the first association information, the subnet identifier corresponding to the MAC address of the obtained packet;
obtaining, from the second association information, the packet type identifier corresponding to the MAC address of the obtained packet;
converting the obtained packet into a multicast packet by setting the subnet identifier obtained from the first association information and the packet type identifier obtained from the second association information in a field of the MAC address of the obtained packet; and
transmitting the converted packet to a different computer via a network.

14. A packet conversion method for causing a computer, which has a storing unit configured to store first association information between a MAC address of a virtual machine connected to a virtual switch and a subnet identifier for identifying a subnet to which the virtual machine belongs, and second association information between a MAC address representing a broadcast address or a multicast address and a packet type identifier, the packet conversion method comprising:
receiving a multicast packet from a different computer via a network;
extracting the subnet identifier and the packet type identifier from a field of a MAC address of the received multicast packet;
obtaining, from the second association information, the MAC address corresponding to the extracted packet type identifier when the first association information includes the extracted subnet identifier;
converting the received packet into an original broadcast or multicast packet by setting the obtained MAC address in the field of the MAC address of the received packet; and
transmitting the converted packet to the virtual machine.

15. A packet conversion method for causing a computer, which has a storing unit configured to store first association information between a MAC address of a virtual machine connected to a virtual switch and a subnet identifier for identifying a subnet to which the virtual machine belongs, and second association information between a MAC address representing a broadcast address or a multicast address and a packet type identifier, the packet conversion method comprising:
obtaining a packet including the MAC address representing the broadcast address or the multicast address from the virtual machine;
obtaining, from the first association information, the subnet identifier corresponding to the MAC address of the obtained packet;
obtaining, from the second association information, the packet type identifier corresponding to the MAC address of the obtained packet;
adding a MAC header to the obtained packet;
converting the obtained packet to which the MAC header is added into a multicast packet by setting the subnet identifier obtained from the first association information and the packet identifier representing broadcast or multicast in a field of a MAC address of the added MAC header; and transmitting the converted packet to a different computer via a network.

16. A packet conversion method for causing a computer, which has a storing unit configured to store first association information between a MAC address of a virtual machine connected to a virtual switch and a subnet identifier for identifying a subnet to which the virtual machine belongs, and second association information between a MAC address representing a broadcast address or a multicast address and a packet type identifier, the packet conversion method comprising:

receiving a multicast packet from a different computer via a network;

extracting a subnet identifier and a packet type identifier from a field of a MAC address of the received packet;

converting the received packet into an original broadcast or multicast packet by validating a second MAC address with deletion of a first MAC address of the received packet when the first association information includes the extracted subnet identifier; and transmitting the converted packet to the virtual machine.

\* \* \* \* \*